(12) United States Patent
Sutanto et al.

(10) Patent No.: US 7,522,771 B2
(45) Date of Patent: Apr. 21, 2009

(54) SYSTEMS, METHODS, AND COMPUTER-READABLE MEDIA FOR FAST NEIGHBORHOOD DETERMINATIONS IN DYNAMIC ENVIRONMENTS

(75) Inventors: Herry Sutanto, Redmond, WA (US); Ming Ye, Bellevue, WA (US); Sashi Raghupathy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 11/081,659

(22) Filed: Mar. 17, 2005

(65) Prior Publication Data

US 2006/0210172 A1 Sep. 21, 2006

(51) Int. Cl.
*G06K 9/46* (2006.01)
(52) U.S. Cl. .................................. 382/203; 382/229
(58) Field of Classification Search ............... 382/119, 382/202, 177, 183, 179, 186, 187, 203; 345/16–18, 345/179, 423
See application file for complete search history.

(56) References Cited

U.S. PATENT DOCUMENTS

| | | | | |
|---|---|---|---|---|
| 5,245,674 A | * | 9/1993 | Cass et al. ................... | 382/200 |
| 5,664,027 A | * | 9/1997 | Ittner ........................... | 382/170 |
| 5,892,843 A | * | 4/1999 | Zhou et al. ................... | 382/176 |
| 6,201,881 B1 | * | 3/2001 | Masuda et al. ............... | 382/100 |
| 7,251,365 B2 | * | 7/2007 | Fux et al. ..................... | 382/185 |
| 7,336,827 B2 | * | 2/2008 | Geiger et al. ................ | 382/186 |
| 2006/0045337 A1 | * | 3/2006 | Shilman et al. .............. | 382/181 |

* cited by examiner

*Primary Examiner*—Matthew C Bella
*Assistant Examiner*—Dennis Rosario
(74) *Attorney, Agent, or Firm*—Lee & Hayes, PLLC

(57) ABSTRACT

Methods, systems, and computer-readable media for ascertaining neighborhood information in a dynamically changing environment, such as an electronic ink environment may include: (a) receiving data representing plural electronic ink strokes; (b) defining a first vertex associated with a first ink stroke; and (c) determining neighboring vertices to the first vertex, wherein the neighboring vertices are associated with ink stroke(s) other than the first ink stroke. Additional systems, methods, and computer-readable media may include: (a) receiving data representing plural electronic ink strokes; (b) defining plural vertices associated with the ink strokes; (c) receiving input indicating a selection of an ink component; and (d) determining at least one neighboring component by determining which ink component(s) located outside of the selection include one or more ink strokes having vertices that neighbor vertices included in the selection.

7 Claims, 17 Drawing Sheets

SYSTEMS, METHODS, AND COMPUTER-READABLE MEDIA FOR FAST NEIGHBORHOOD DETERMINATIONS IN DYNAMIC ENVIRONMENTS

FIELD OF THE INVENTION

The present invention relates to the processing of electronic data. Various aspects of the present invention are useful in the analysis of electronic ink data, including maintaining and/or determining "neighborhood" information for electronic ink strokes, words, lines, blocks, or other groupings of electronic ink data.

BACKGROUND

As the role of computers has expanded, various different techniques have been developed for entering data into computers. One particularly useful technique for entering data is through the use of handwriting. By writing with a stylus or another object onto a digitizer to produce "electronic ink," a computer user can forego the bulk and inconvenience associated with a conventional keyboard. Handwriting input conveniently may be used, for example, by doctors making rounds, architects on a building site, couriers delivering packages, warehouse workers walking around a warehouse, and in any situation when the use of a keyboard would be awkward or inconvenient.

While the possibility for entering handwritten input is more convenient than keyboard input in many situations, particularly for some computer users, text written in electronic ink typically cannot be directly manipulated by most software applications. Instead, text written in electronic ink typically must be analyzed and converted into another form, such as ASCII characters or other machine-generated or recognizable text or input. Analysis and conversion of this type include handwriting recognition processes, which recognize handwritten characters and convert them to machine-recognizable text, shapes, structures, or the like, e.g., based upon various relationships between individual electronic ink strokes making up the electronic ink input, such as the spatial and/or temporal relationships between individual ink strokes.

Handwriting recognition algorithms have improved dramatically in recent years, but their accuracy can be reduced under certain conditions, such as when electronic ink is written at an angle. Likewise, when separate groups of ink strokes cannot be easily distinguished, such as when two or more words are written closely together, many recognition algorithms will not accurately recognize the electronic ink. Some recognition algorithms also may incorrectly recognize electronic ink input as text when, in fact, the electronic ink was intended to be a drawing. For example, a user may annotate typewritten text, e.g., by writing an electronic ink stroke that underlines, highlights, circles, or crosses through some portion of the typewritten text. A handwriting recognition algorithm might then incorrectly recognize these annotation strokes as a dash, the number zero, the letter "O, the letter "T," or the like.

The accuracy of many recognition algorithms can be greatly improved by "parsing" (e.g., by analyzing the layout of and/or "classifying") the electronic ink before sending the data through the handwriting recognition algorithm. A "classification" process typically determines whether an individual electronic ink stroke is part of a drawing (that is, a drawing ink stroke), part of handwritten text (that is, a text ink stroke), or some other special symbol (e.g., a mathematical symbol, a music symbol, a basic shape, other known symbols, etc.). Classification algorithms for identifying a wide variety of different symbols or stroke types are possible. A "layout analysis" process typically groups electronic ink strokes into meaningful associations, such as words, lines, paragraphs, etc. Layout analysis and classification processes thus may be used to identify which strokes in a collection of electronic ink belong to a single word, which words of the electronic ink are associated with a single line of text written in electronic ink, which lines of text written in the electronic ink are associated with a paragraph, which strokes are part of a drawing, music, mathematical equations, etc.

In order to prevent long "down" times or delays when the computer processor is not available to accept ink or other user input, electronic ink parsing, recognition, and/or other processing may be performed in an "incremental" manner, optionally while electronic ink and/or other data continues being entered into an electronic document. This processing also may be performed in a background thread while a user continues entering data, including electronic ink data, into a document, so that the user experiences minimal processing delays.

In some instances or application programs that handle electronic ink data, a user or application program may wish to know or determine what strokes, words, lines, and/or blocks of electronic ink or other data are located physically close to (i.e., spatially "neighboring") other strokes, words, lines, and/ or blocks of electronic ink or other data. Because of the dynamic and incremental nature of electronic ink input and/or its processing (e.g., via continued ink entry, via cut or paste operations, delete operations, via new downloads, etc.), the spatial relationships and the "neighborhood" of an ink stroke or collection of ink strokes (or other data) can change dramatically and quickly over time. Complete reparsing and/or re-determination of "neighborhood" data every time a parser changes an electronic ink data structure and/or every time "neighborhood" information is requested would result in very long processing times and very long processing delays. These long processing times and delays would frustrate computer users and/or render such systems unacceptably slow.

Accordingly, there is a need for electronic ink processing techniques that enable fast neighborhood determinations in dynamic electronic ink and/or other data processing environments.

SUMMARY

Aspects of this invention relate to methods, systems, and computer-readable media for ascertaining neighborhood information in a dynamically changing environment, such as an electronic ink environment. Systems and methods for determining neighbors of electronic ink strokes and/or other collections of electronic ink data in accordance with examples of this invention may include: (a) receiving data (e.g., via an input system, such as a digitizer, disc drive, network connection, etc.) representing plural electronic ink strokes including at least a first electronic ink stroke; (b) defining at least a first vertex associated with the first electronic ink stroke (e.g., using a processor system); and (c) determining at least a first neighbor vertex to the first vertex (e.g., using a processor system), wherein the first neighbor vertex is associated with an electronic ink stroke other than the first electronic ink stroke. Additional systems and methods in accordance with examples of this invention may include: (a) receiving data (e.g., via an input system, such as a digitizer, disc drive, network connection, etc.) representing plural electronic ink strokes, wherein at least some of the plural electronic ink strokes may be grouped in a hierarchical manner (e.g., via a processing system) to form a hierarchical association of plural electronic ink components; (b) for at least some of the plural electronic ink strokes, defining plural vertices associated with the respective electronic ink strokes (e.g., via a processing system); (c) receiving input data indicating a selection of at least one electronic ink component (e.g., via an input system); and (d) determining at least one electronic ink component that neighbors the electronic ink component or components included in the selection (e.g., by a processing system) by determining which electronic ink component or components located outside of the selection include one or more electronic ink strokes having one or more vertices that are neighbors to one or more vertices included in the selection. Still additional aspects of this invention relate to computer-readable media, including computer-executable instructions stored thereon, for performing various electronic ink component neighborhood determination methods and operating various electronic ink component neighborhood determining systems, including the various systems and methods described above.

BRIEF DESCRIPTION OF THE DRAWINGS

The above and other objects, features, and advantages of the present invention will be readily apparent and fully understood from the following detailed description, taken in connection with the appended drawings, in which.

DETAILED DESCRIPTION

I. Terms

Figure 1:
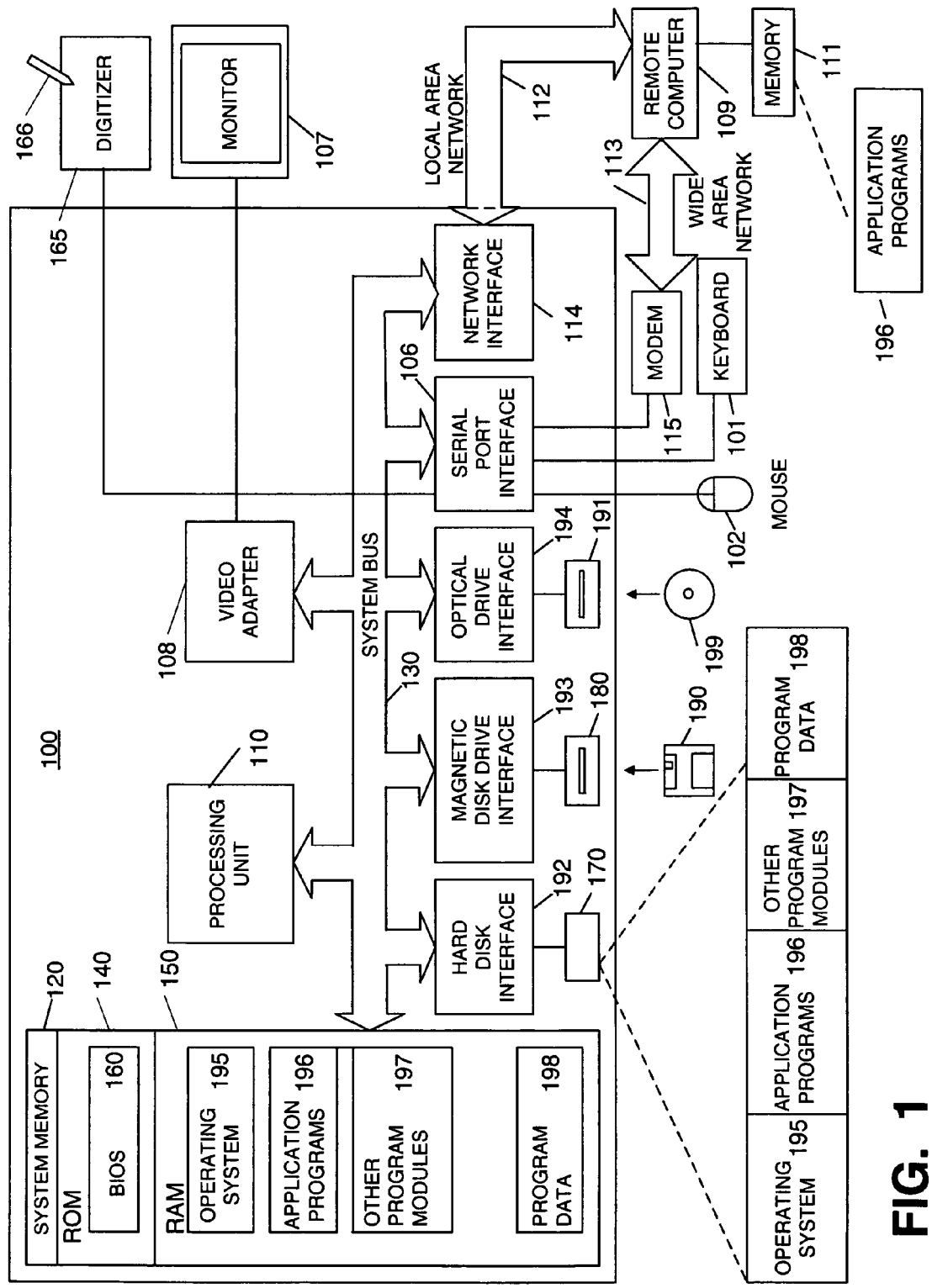
FIG. 1 illustrates a schematic diagram of a general-purpose digital computing environment in which certain aspects of the present invention may be implemented.

The following terms are used in this specification and, unless otherwise specified or clear from the context, the terms have the meanings provided below:

Ink (also called "digital ink" or "electronic ink")—A sequence or set of handwritten strokes. A sequence of strokes may include strokes in an ordered form. The sequence may be ordered in any suitable manner, such as by the time the stroke was captured and/or by where the stroke appears on a page. Other orders are possible. Electronic ink information also may be stored in an "ink serialized format," e.g., a format used for creating, storing, displaying, and manipulating electronic ink data in the Microsoft® Windows XP Tablet PC Edition Version 2002 operating system and/or the Microsoft® Windows Journal software application.

Point—Information defining a location in space. For example, a point may be defined relative to a capturing space (for example, points on a digitizer) and/or a display space (the points or pixels of a display device). Points may be represented using a variety of known techniques including two dimensional Cartesian coordinates $(X, Y)$, polar coordinates $(r, \Theta)$), three dimensional coordinates $((X, Y, Z), (r, \Theta, \rho), (X, Y, t$ (where t is time$)), (r, \Theta), t))$, four dimensional coordinates $((X, Y, Z, t)$ and $(r, \Theta, \rho, t))$, and other techniques as known in the art. A "vertex," as described in more detail and used in the description below, may constitute a point on or associated with an electronic ink stroke.

Stroke—A sequence or set of captured points. A stroke may be determined in a number of ways, for example, using time (e.g., a stroke is all points encountered by the stylus during a predetermined time interval), using a predetermined number of points (e.g., a stroke is all points 1 through X where X is predefined), or using stylus contact with the digitizer surface (e.g., a stroke is all points encountered by the stylus between a pen-down event and a pen-up event). When rendered, the sequence of points may be connected with lines. Alternatively, a stroke may be represented as a point and a vector in the direction of the next point. Further, a stroke may be referred to as a simple list (or array or table) of points. In short, a stroke is intended to encompass any representation of points or segments relating to ink, irrespective of the underlying representation of points and/or what connects the points.

Render—The process of determining how graphics (and/or ink) are to be displayed, whether on a screen or printed.

Parse Tree—A data structure representing the structure of a document, including, but not limited to electronic ink documents. Using a "parse tree" data structure, a given page or other collection of data representing an electronic document may be parsed into blocks (e.g., paragraphs, lists, etc.), lines, words, and/or individual strokes or into any other desired type of arrangement, including hierarchical arrangements.

Parse engine—A single processing step or procedure in an ink analysis engine. A typical ink analysis engine may contain several parse engines, each focusing on a particular task. One example of an ink analysis engine is a layout analysis engine, which can collect and group various individual ink strokes (e.g., into words, lines, paragraphs, lists, etc.) based on their relative spatial relationships and/or temporal relationships. A parse engine may take a parse tree data structure as input and modify the parse tree (if appropriate) to produce a parse tree with a different data structure, which in turn may be passed along as input to the next parse engine or used by the same parse engine as input in a next iteration or run of the parse engine.

"Computer-Readable Medium"—any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. Example Operating Environment

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows an exemplary environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
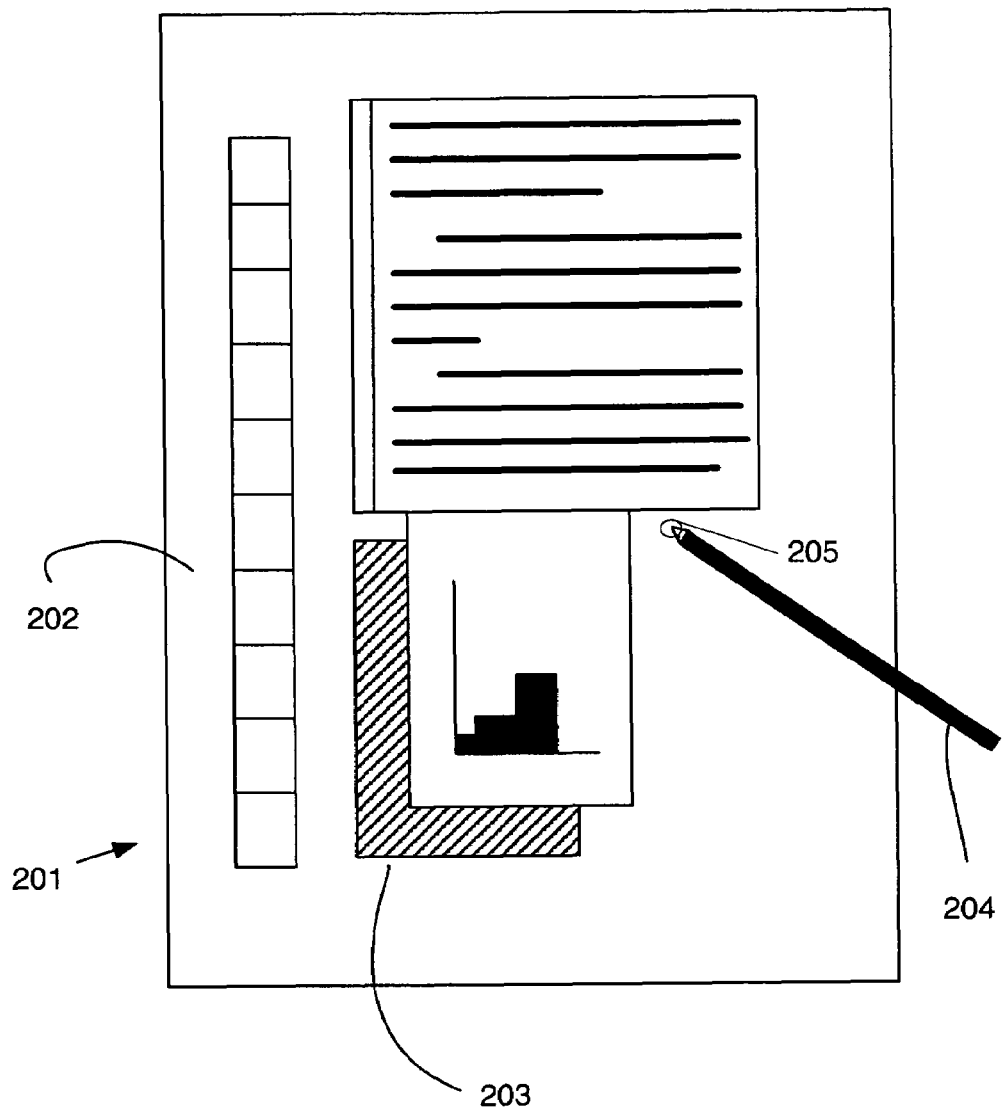
FIG. 2 illustrates a pen-based personal computing (PC) environment in which certain aspects of the present invention may be implemented.

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as pen digitizers available from Mutoh Co. (now known as Fine-Point Innovations Co.) or Wacom Technology Co. Other types of pen digitizers, e.g., optical digitizers, and touch-sensitive digitizers may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may include a mark-up language including a language like the extensible markup language (XML). Further, the system may use DCOM as another implementation. Yet further implementations may be used including the Win32 programming model and the Net programming model from Microsoft Corporation. These platforms are commercially available and known in the art.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or accept electronic pen or stylus input, such as: handheld or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus, or which can process electronic ink collected by another device (e.g., a conventional desktop computer that can process electronic ink collected by a tablet PC).

The invention now will be described in conjunction with the remaining figures, which illustrate various examples of the invention and information to help explain the invention. The specific figures and information contained in this detailed description should not be construed as limiting the invention.

III. General Overview of the Invention

As mentioned above, aspects of this invention relate to methods, systems, and computer-readable media for ascertaining neighborhood information for data in a dynamically changing environment, such as in a parse tree or other data structure during parsing, e.g., used in an electronic ink environment.

One aspect of this invention relates to methods for determining neighbors of electronic ink strokes. Such methods may include: (a) receiving data representing plural electronic ink strokes including at least a first electronic ink stroke; (b) defining at least a first vertex associated with the first electronic ink stroke; and (c) determining at least a first neighbor vertex to the first vertex, wherein the first neighbor vertex is associated with an electronic ink stroke other than the first electronic ink stroke. Methods in accordance with at least some examples of this invention further may include storing information identifying the first neighbor vertex and associating the first neighbor vertex with at least one of the first vertex or the first electronic ink stroke. Still additional features of methods in accordance with examples of this invention may include displaying, outputting, storing, or otherwise making available the neighbor vertex identification and/or association information (optionally based on input including selection or identification of a stroke or vertex). The neighboring vertices of a given vertex may be determined in any desired manner, such as through the use of triangulation processes, such as Delaunay triangulation.

Additional aspects of this invention relate to electronic ink processing methods that may include: (a) receiving data representing plural electronic ink strokes, wherein at least some of the plural electronic ink strokes are grouped in a hierarchical manner to form a hierarchical association of plural electronic ink components; (b) for at least some of the plural electronic ink strokes, defining plural vertices associated with the respective electronic ink strokes; (c) receiving input data indicating a selection of at least one electronic ink component; and (d) determining at least one electronic ink component that neighbors the electronic ink component or components included in the selection by determining which electronic ink component or components located outside of the selection include one or more electronic ink strokes having one or more vertices that are neighbors to one or more vertices included in the selection. Additional features of methods in accordance with examples of this invention may include displaying, storing, outputting, or otherwise making available information identifying the electronic ink component or components determined to neighbor the electronic ink component or components in the selection. The determination as to which electronic ink component or components located outside of the selection include one or more electronic ink strokes having one or more vertices that are neighbors to one or more vertices included in the selection may be made in any desired manner without departing from the invention, including through the use of triangulation processes, such as Delaunay triangulation processes.

If desired, in accordance with at least some examples of this invention, data relating to the electronic ink strokes and/or vertices may be stored or maintained as a hierarchical association of electronic ink components. For example, one or more individual ink strokes may grouped or associated together as electronic ink words; one or more electronic ink words may be grouped or associated together as electronic ink lines and/or paragraphs; one or more electronic ink lines may be grouped or associated together as electronic ink paragraphs, blocks, and/or pages; etc.

In some example methods according to the invention, when the selection includes at least one electronic ink word, the "determining" may include determining which electronic ink word or words located outside of the selection include one or more electronic ink strokes having one or more vertices that are neighbors to one or more vertices included in the electronic ink word or words of the selection. As another example, when the selection includes a first electronic ink line, the "determining" may include determining which electronic ink line or lines located outside of the selection include one or more electronic ink strokes having one or more vertices that are neighbors to one or more vertices included in the selected first electronic ink line. If desired, other hierarchical components may be determined for a given selection without departing from the invention (e.g., the line or lines that neighbor a given word may be determined, the word or words that neighbor a given line may be determined, etc.).

Still additional aspects of this invention relate to systems for performing various neighbor determining methods, including the various methods described above. Example systems in accordance with this invention may include: (a) an input system (such as a digitizer, a disc drive, a network connection, etc.) for receiving input data representing plural electronic ink strokes including at least a first electronic ink stroke; and (b) a processing system (e.g., one or more computer processors) programmed and adapted to: (i) define at least a first vertex associated with the first electronic ink stroke, and (ii) determine at least a first neighbor vertex to the first vertex, wherein the first neighbor vertex is associated with an electronic ink stroke other than the first electronic ink stroke. Such systems further may include a storage system (e.g., computer-accessible or processor-accessible memory, such as RAM) for storing information identifying the first neighbor vertex and associating the first neighbor vertex with at least one of the first vertex or the first electronic ink stroke; and an outputting system for displaying or otherwise making the neighbor information available (e.g., displaying on screen, providing as electronic data, sending to another application program, storing, etc.).

In at least some examples of systems in accordance with this invention, the processing system further may be programmed and adapted to group, store, and/or otherwise process at least some of the plural electronic ink strokes in a hierarchical manner to form a hierarchical association of plural electronic ink components (such as ink words, lines, paragraphs, blocks, lists, pages, etc.), and/or the processing system may be programmed and adapted to define plural vertices associated with at least some of the electronic ink strokes. In such systems, the input system further may be designed for receiving input data indicating a selection of at least one electronic ink component, and the processing system further may be programmed and adapted to determine at least one electronic ink component that neighbors the electronic ink component or components included in the selection by determining which electronic ink component or components located outside of the selection include one or more electronic ink strokes having one or more vertices that are neighbors to one or more vertices included in the selection. If desired, the processing system further may be programmed and adapted to output, display, store, or otherwise make available information identifying the electronic ink component(s) determined to neighbor the electronic ink component(s) in the selection.

Additional aspects of this invention relate to computer-readable media including computer-executable instructions stored thereon for performing various electronic ink component neighborhood determination methods and operating various electronic ink component neighborhood determining systems, including the various systems and methods described above (and those systems and methods described in more detail below).

IV. Specific Examples of the Invention

Figure 3A:
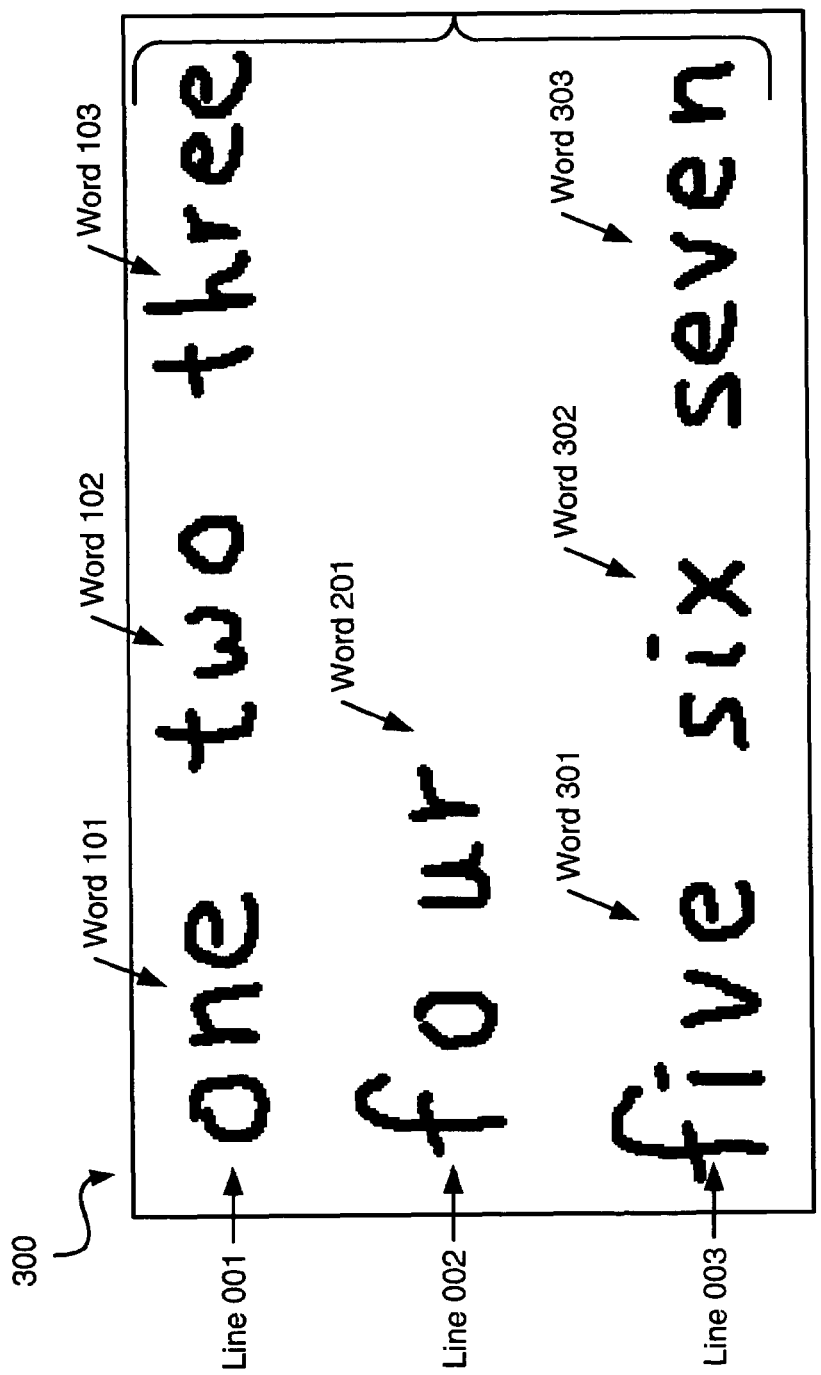
FIG. 3A illustrates an example of electronic ink input, e.g., in a pen-based computing environment.

FIG. 3A generally illustrates an example of electronic ink input as it may be input, received, and/or rendered in a pen-based computing system, such as a tablet PC, a PDA, or the like. This electronic ink input may be accepted in various different forms or formats, including, for example, an ink serialized format ("ISF") used to store data identifying the strokes (e.g., location information relating to the points of each stroke, timing information relating to each stroke, etc.). Reference number 300 in FIG. 3A generally represents an overall electronic document, which in the illustrated example includes only the information shown in FIG. 3A. Of course, an electronic document may include any amount of data, including multiple pages or screens of electronic ink data, without departing from this invention.

Figure 3B:
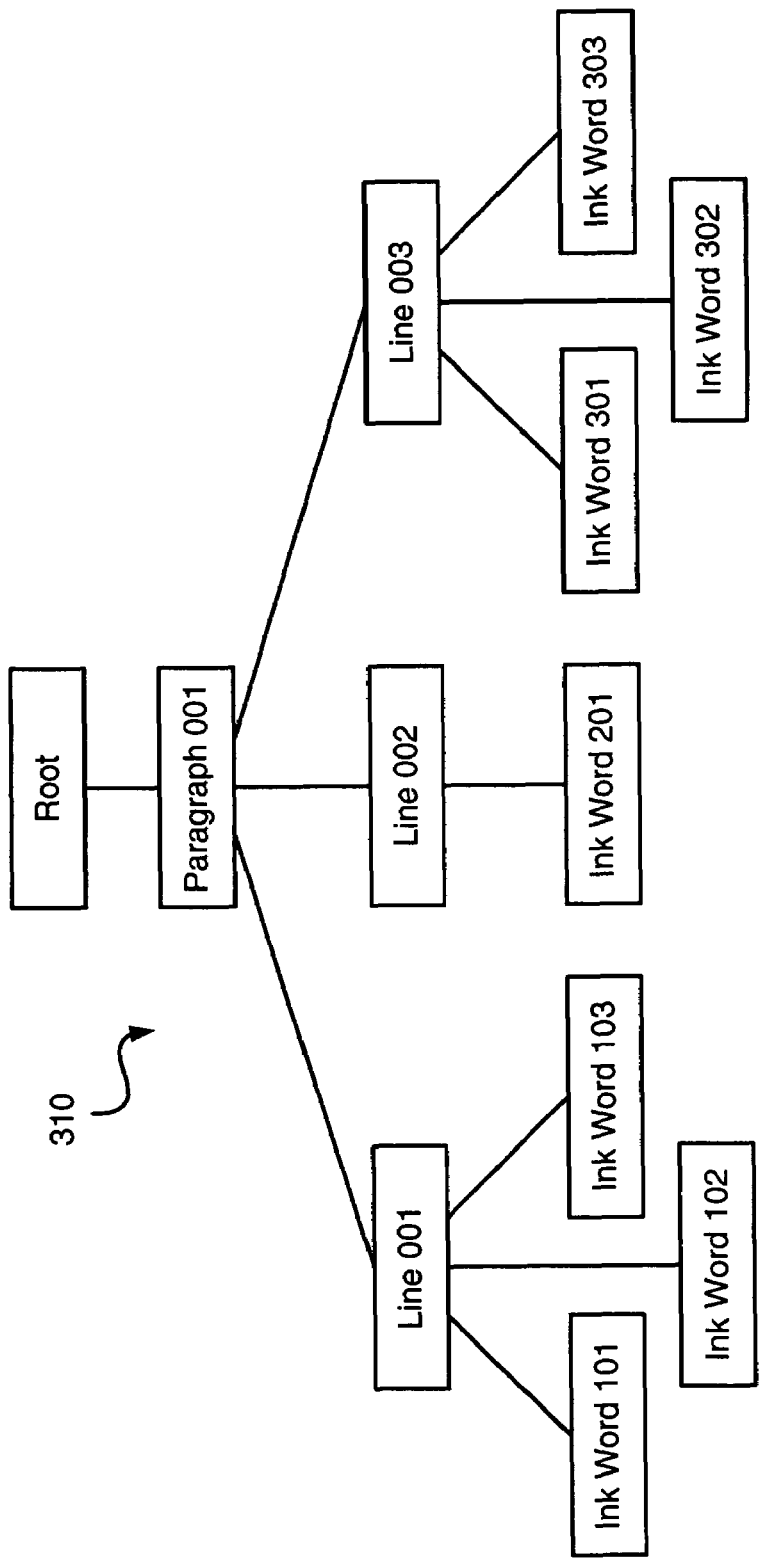
FIG. 3B illustrates an example parse tree document structure for the electronic ink input of FIG. 3A.

Parsing technology, which may be associated with at least some operating systems and/or application programs operating on tablet PCs or the like, may be used to group individual electronic ink strokes (and/or optionally any other desired type of data, including, for example, word processor data, spreadsheet data, etc.) into useful or meaningful groupings, such as into electronic ink words, lines, lists, paragraphs, blocks, pages, annotations, drawings, other symbols, or the like. FIG. 3B illustrates an example hierarchical parse tree data structure 310 for the collection of ink strokes provided in FIG. 3A. Each "node" of the parse tree data structure 310 (a "node" is signified by the various boxes in the diagram) may have various data stored and associated with it. For example, the root node may include data identifying the overall electronic document (such as GUID data, a stored name, a temporary identifier, or the like), as well as information, identifiers, or pointers to various blocks or collections of data included in or otherwise associated with the electronic document, information tying or linking the document to other electronic documents, language data, creation time data, edit history data, last edit data, hyperlink data, etc. Of course, other data may be associated with and/or saved as part of the root data node without departing from this invention.

In the illustrated example, the electronic document 300 of FIG. 3A includes a single "paragraph" or "block" of data, identified in the data structure 310 of FIG. 3B as the node "Paragraph 001." The paragraph node or nodes of a parse tree data structure (e.g., Paragraph 001 node of data structure 310) also may have various data stored and/or associated with it, such as the current location of the paragraph in the electronic document (e.g., on the display, on a page, etc.), identifiers or pointers to the various lines of data contained in the paragraph, identifiers or pointers to preceding or succeeding paragraphs (if any), bounding box data, etc. In the example shown in FIGS. 3A and 3B, Paragraph 001 (the sole paragraph of example electronic document 300) includes three individual lines of associated electronic ink data, namely Line 001, Line 002, and Line 003. Of course, other data may be associated or saved as part of a paragraph node (or other block node) without departing from this invention.

The electronic ink data collected and associated in the data structure 310 under the various line nodes also may have various different types of data or information associated with it. For example, the line nodes may include data indicating the current location of the line in the electronic document (e.g., an absolute location, a Paragraph Node identifier, etc.), an identifier of the base or center line for the line, the base or center line's direction, an identifier or pointer to the various words in the line, an identifier or pointer to the preceding and/or succeeding lines (if any), bounding box data, etc. In the example shown in FIGS. 3A and 3B, Line 001 contains three words (Ink Words 101, 102, and 103), Line 002 contains one word (Ink Word 201), and Line 003 contains three words (Ink Words 301, 302, and 303). If parsing is conducted correctly by the parse engine, Ink Words, 101, 102, 103, 201, 301, 302, and 303 will correspond to the electronic ink words, "one," "two," "three," "four," "five," "six," and "seven," respectively, in FIG. 3A. Of course, other data may be associated or saved as part of a line node without departing from this invention.

Figure 3C:
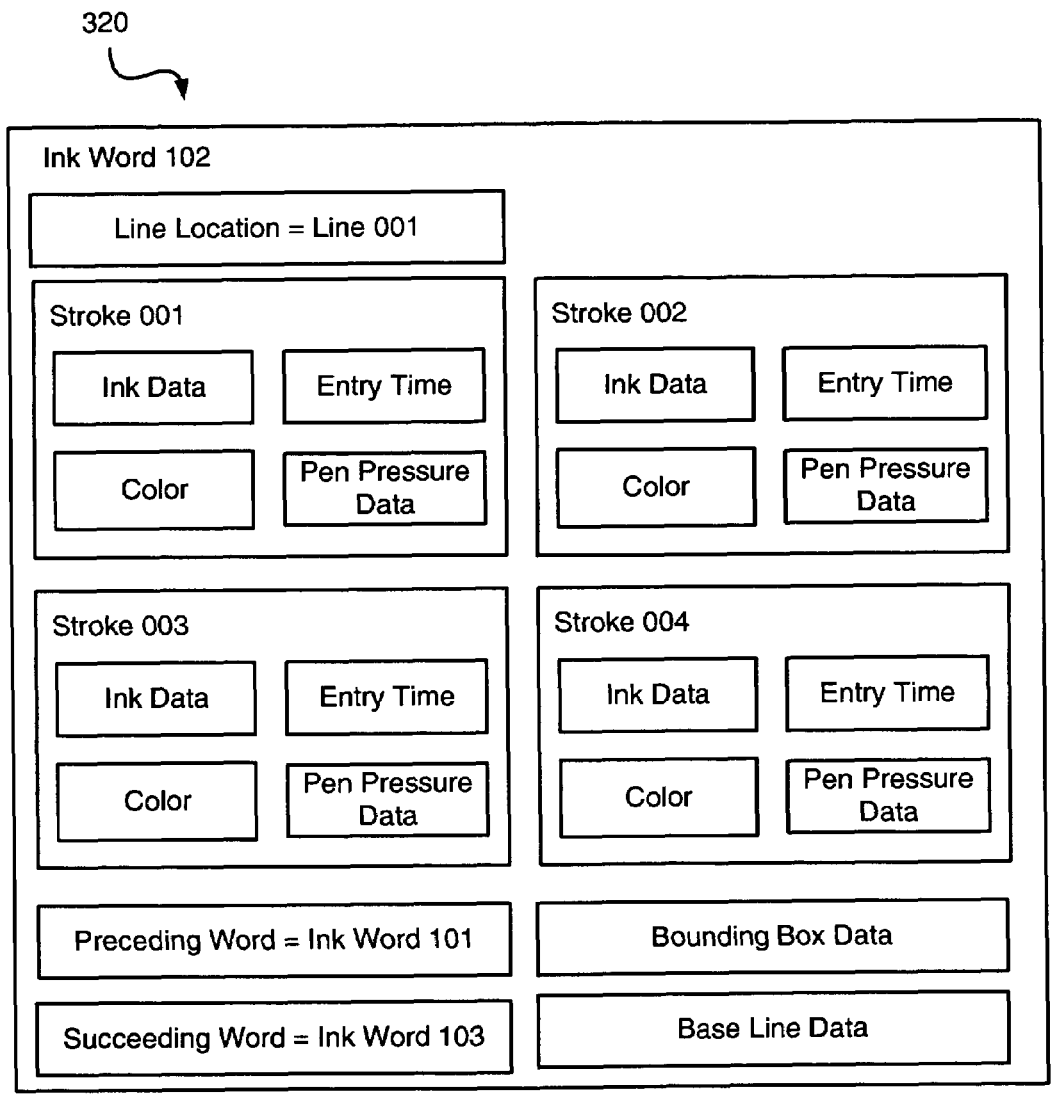
FIG. 3C illustrates an example data structure for electronic ink word components that may be used with the document structure of FIG. 3B.

Various data or information also may be associated with and/or stored in the data structure corresponding to the various word nodes of an electronic document (e.g., document 300). An example of a data structure 320 for an electronic ink word is shown in FIG. 3C, specifically, an example data structure 320 for Ink Word 102 (corresponding to the word "two" in FIG. 3A) is shown. As examples, data stored for and/or associated with each individual ink word in a data structure may include: (a) an identifier or pointer to the node of the line where the ink word is located (i.e., Line 001, in this example); (b) an identifier or pointer to the nodes of the preceding and/or succeeding words (i.e., Ink Words 101 and 103, respectively, in this example), if any; (c) bounding box or convex hull data; (d) base line location or direction data; etc. Of course, other data may be saved as part of the ink word data without departing from this invention, such as the "recognized text" associated with the word, "recognizer alternatives" associated with the word, absolute location data, and the like.

Figure 3D:
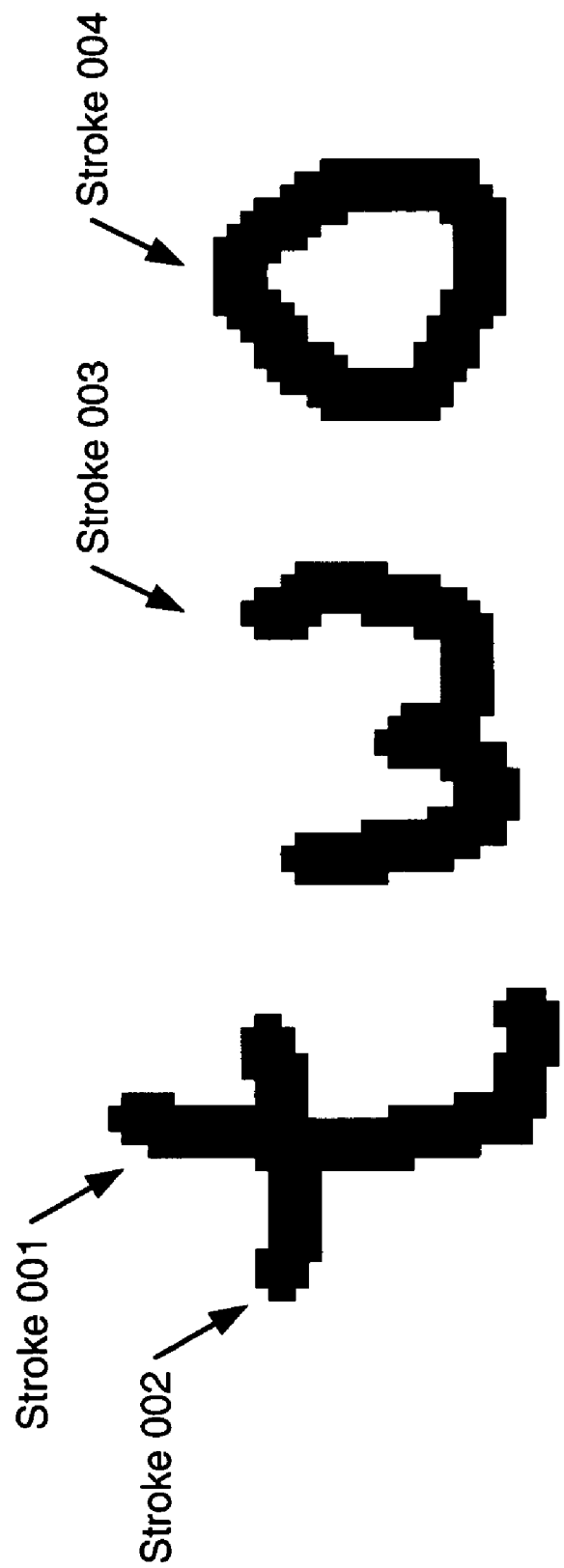
FIG. 3D illustrates example strokes associated with example electronic ink input, e.g., in a pen-based computing system.

Additionally, as illustrated in FIG. 3C, ink word node data (such as data structure 320) may include data relating to the individual ink strokes that make up the ink word (e.g., Stroke 001 (the generally vertical stroke of the letter "t," as shown in FIG. 3D), Stroke 002 (the generally horizontal crossbar of the letter "t"), Stroke 003 (the entire letter "w"), and Stroke 004 (the entire letter "o"), in this example). The stroke data also may have various properties or other data associated with it, such as the underlying ink data (e.g., the digitizer points relating to the stroke, ink serialized format data relating to the stroke, or other data that describes the stroke), ink color data, stroke entry time data, pen pressure data, an identifier of or pointer to the preceding stroke and/or the succeeding stroke in time, bounding box or convex hull data, "recognized text" data, "recognizer alternatives" data, and the like. The information or data included, stored, or associated as part of an ink word may be stored in the data structure 320 in any suitable or desired manner, such as by defining "properties," or the like.

In some situations, a user, a parser, or an application program may require or be interested in determining, tracking, and/or retrieving data or information from an electronic ink document relating to the "neighbors" of a specific grouping of electronic ink input. For example, a user, a parser, or an application program may find it useful to determine which other words are located closest to (or neighbors of) a specific word, line, paragraph, block, list, and/or selection (e.g., a collection of one or more strokes, words, lines, paragraphs, lists, blocks, and/or combinations thereof, e.g., a collection of data identified using a block or lasso select feature or the like).

As one example, a parser system may find it useful to determine which words are neighbors of other words (and where these neighboring words are located) to determine if a given word or words and some of its neighboring strokes, words, etc., should be combined or grouped in the data structure, e.g., to form a larger word, a single line (or paragraph, etc.,), classified as a list, etc. While computer systems and methods could separately track and maintain this type of neighborhood data within the various nodes for the individual strokes, words, lines, blocks, etc., such neighborhood data would have to be redetermined frequently (i.e., each time the parse tree 310 changed) to keep it current, or it would have to be recalculated whenever the neighborhood information was requested or needed. These limitations would result in significant and frustrating processing delays for the user as the updated neighborhood information was repeatedly determined and/or redetermined. Moreover, such neighborhood information would be limited to the stored or calculated data within the nodes and would not allow for flexible determination of neighborhoods based on user selections and/or other groupings of electronic ink data. Accordingly, aspects of this invention relate to the ability to make neighborhood data readily available and/or determinable, for various different ink or data groupings or selections, in a dynamic environment, such as in an environment in which a user is actively entering or editing electronic ink data and/or at intermediate times while a parser engine is grouping and processing input electronic ink (or other) data, e.g., into a hierarchical data structure.

Figure 4A:
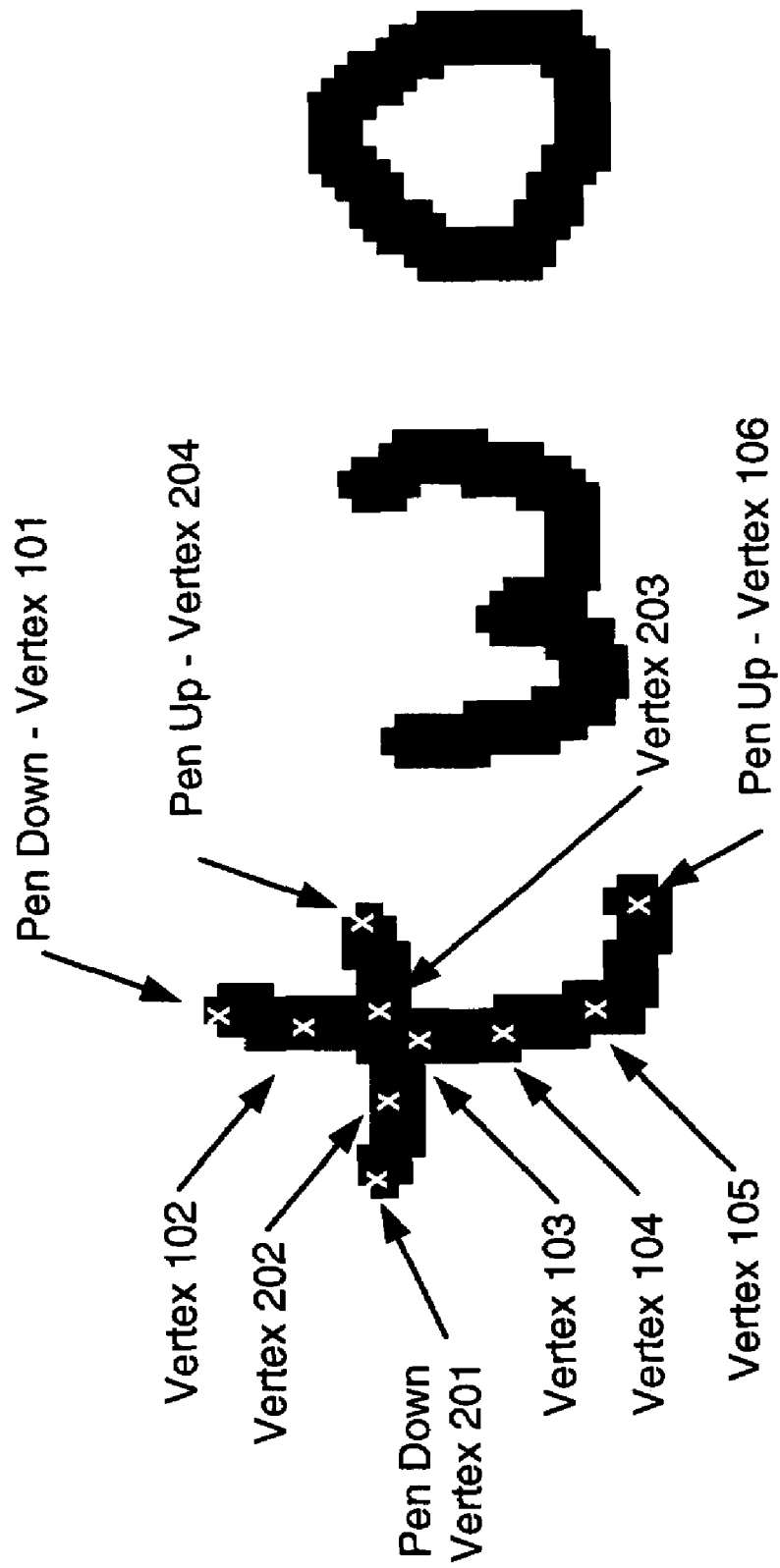
FIG. 4A illustrates an example of vertex location and determination in example electronic ink input, e.g., in a pen-based computing environment.

To allow "neighborhood" processing, e.g., in dynamic environments of the type generally described above, when accepting input electronic ink data, systems and methods in accordance with examples of this invention will receive, determine, and/or store the locations of various "vertices" associated with each ink stroke. The locations of the vertices may be determined and/or assigned in any suitable or desired manner without departing from this invention. For example, vertices may be assigned to the "pen-down" and "pen-up" locations, which mark the beginning and end, respectively, of an electronic ink stroke. Additionally, as examples, vertices may be assigned at some or all of the locations on a stroke where the pen changes direction of movement (e.g., consider a stroke as a series of straight lines between adjacent points where the line direction must change to follow the stroke—each point where there is a direction change may constitute a vertex). As still an additional example, vertices may be assigned at specific time intervals based on the location of the pen on the digitizer as the stroke is being drawn (e.g., the location of the pen every 50 ms during a stroke may identify a new vertex point). Also, combinations of these vertex assignment methods and/or additional vertex assignment techniques may be used without departing from the invention. FIG. 4A illustrates the Ink Word 102 from FIGS. 3A and 3D (the word "two") with various example vertices defined for the strokes contained therein. Any number of vertices may be assigned to and/or associated with a given stroke without departing from this invention.

Figure 4B:
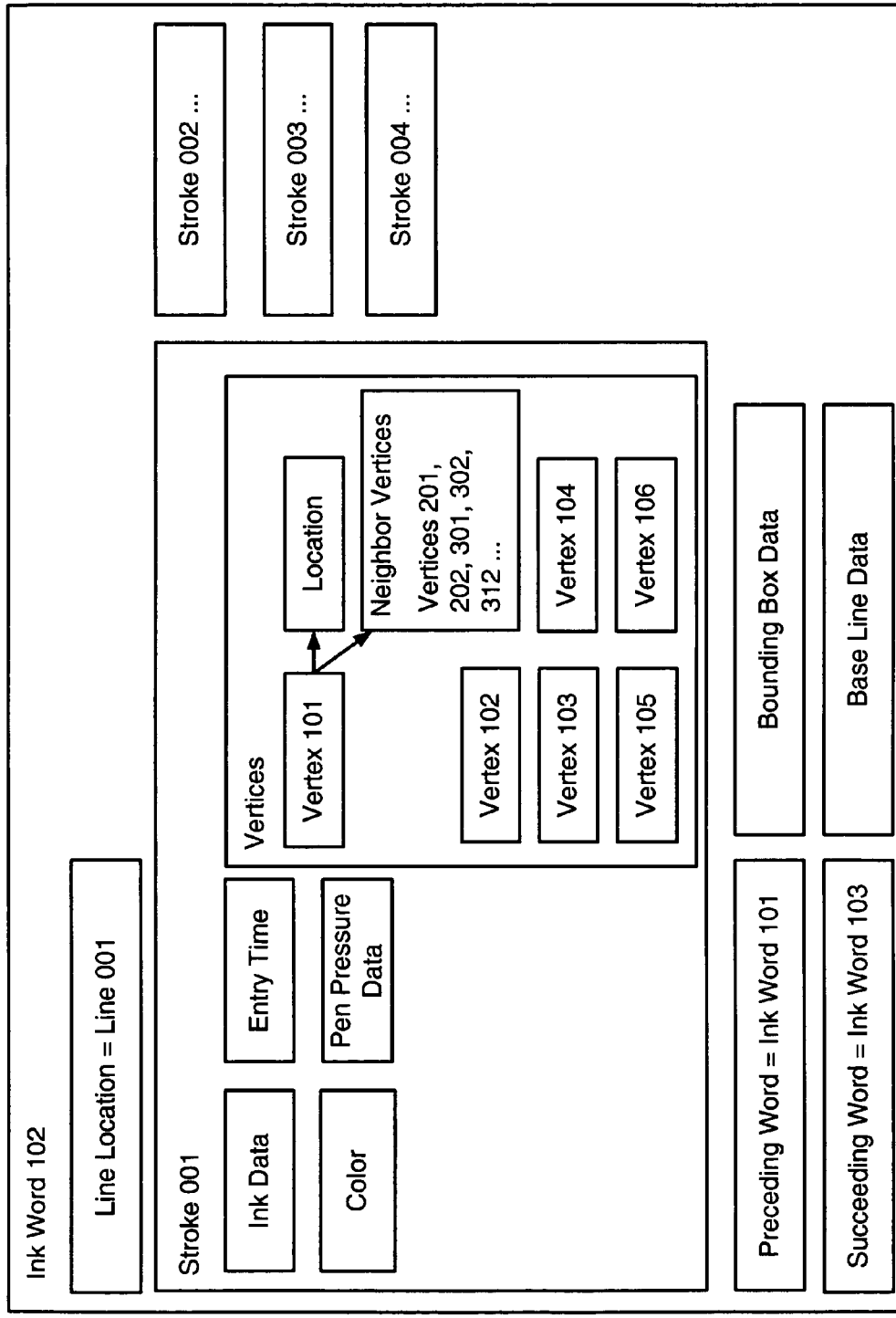
FIG. 4B illustrates an example data structure for electronic ink word components that includes stroke vertex and neighboring vertex information.

FIG. 4B illustrates an example data structure 400 for an electronic ink word in accordance with at least some examples of this invention. More specifically, in this example, the data structure for Ink Word 102 again is shown (e.g., as in FIG. 3C), but in this instance the Stroke portions (e.g., Stroke properties) in the data structure 400 additionally include one or more properties or other data sets identifying the various vertices for and/or associated with the individual ink strokes. As illustrated in this example, for each vertex, "location" information relating to the vertex may be stored (e.g., absolute location information with respect to digitizer points or digitizer space, relative location information based on the stroke, word, or other "container" node location, etc.). Of course, any way of storing and/or associating vertex data with a given stroke may be used and any desired information may be stored relating to the vertices without departing from this invention.

Once the various vertices for a given stroke are determined, the "neighboring" vertices located on and/or associated with another stroke in the document then may be determined. Any suitable or desired manner of determining the neighboring vertices of a given vertex may be used without departing from this invention. As one example, a "neighboring" vertex may be determined as any vertex that can be reached by a straight line from the given vertex for which the neighboring information is sought, provided that straight line does not cross or intersect any stroke (e.g., including the stroke containing the given vertex for which the neighboring information is sought). In accordance with at least some examples of this invention, triangulation methods may be used for determining the "neighboring" vertices of a given vertex. As one even more specific example, Delaunay triangulation may be used to determine the "neighboring" vertices of a given vertex ("Delaunay triangulation" of a point set constitutes a collection of edges satisfying an "empty circle" property: for each edge, a circle containing the edge's endpoints but not containing any other points may be determined). Delaunay triangulation techniques are conventional and known in their relevant art, such as in GPS and mapping arts, and various computer programs and/or applets are known and publicly available for determining Delaunay triangulation data. For example, if a "circumcircle" determined for two vertices does not contain other vertices (e.g., in any stroke), then those vertices (i.e., the vertices making up the "edge") are considered "neighbors." If the circumcircle for the vertices making up the edge contain other vertices in the ink document, then the vertices are not considered "neighbors."

Figure 4C:
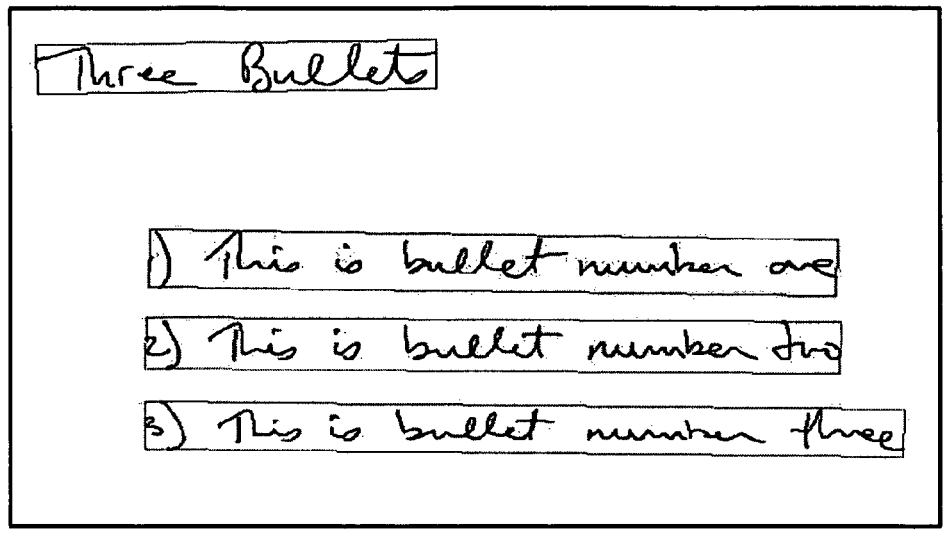
FIGS. 4C and 4D illustrate more detailed examples of electronic ink input and locating vertex neighbors of electronic ink vertices and strokes using Delaunay triangulation.
Figure 4D:
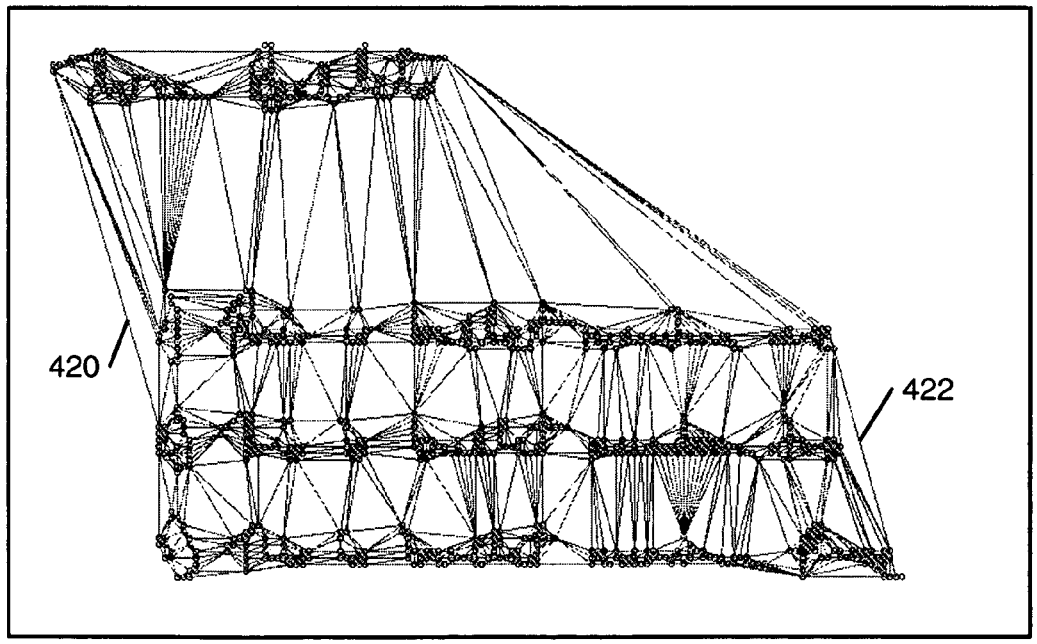

FIGS. 4C and 4D illustrate examples of actual input electronic ink data (FIG. 4C) and the results of the use of Delaunay triangulation to determine neighboring vertices for the vertices of a given stroke (FIG. 4D). As evident from FIG. 4D, an individual vertex may have any number of "neighboring" vertices associated with it. Also, due to the use of triangulation techniques (and particularly Delaunay triangulation techniques in this example), a "neighboring" vertex actually may be located more than one stroke, one word, one line, or even one paragraph or block from a given vertex. For example, in FIG. 4D, some of the vertices in the number "2" are identified as neighbors of vertices in the letter "T" in the word "Three" (see line 420), even though these vertices actually are located in "words" located two lines apart. Also, as shown in FIG. 4D, at least one vertex in the letter "e" of the word "one" is identified as a neighbor with at least one vertex in the final letter "e" of the word "three" (line 422) despite the fact that the lines containing these words have a third line located between them.

As illustrated in FIG. 4B, for each vertex, a complete listing of its "neighbor vertices" may be determined (e.g., by Delaunay triangulation or any other desired method) and stored, optionally in the Ink Word data structure 400, e.g., as a property optionally linked to and/or associated with the vertices defined in a given stroke. In this manner, for each vertex, neighboring vertex information is determined and stored, and this information may be updated relatively quickly as new strokes (and their corresponding vertices) are entered. Additionally, because the vertices and neighboring vertices of any newly entered strokes must be determined to fill in their corresponding data structures (like data structure 400 of FIG. 4B), minimal additional processing time and/or data writing time is needed to update the "neighbor vertices" properties of previously existing ink words (or other) data structures.

Moreover, by determining and storing the neighbor vertices only at the stroke level (or the lowest available hierarchical level), a relatively static neighborhood environment is maintained. For example, once a given set of neighboring vertices are determined for a given vertex, only the addition, deletion, resizing, or moving of ink strokes in the general area of the vertex may change the neighboring vertex information. Simple reorganization of the parse tree data structure (e.g., due to operation of a parsing engine) does not require any redetermination of neighborhood information for a given vertex at the stroke level. Moreover, because neighboring vertex or other information is not stored at the higher hierarchical levels in the parse tree (i.e., at the individual word, line, paragraph, or other levels, as will be described in more detail below), limited computer processing time and resources are utilized in keeping the neighboring vertex information current and up to date.

Optionally, rather than providing the "neighboring vertices" data within an ink word node (e.g., as a property of the word), the vertex data may include an indicator or pointer to an entry for the vertex in a master "Neighbor Vertices" table maintained by the system, wherein this master table includes a listing of all vertices and their corresponding neighboring vertices in the electronic document. As another example, the hierarchical data structure may include a separate "stroke" level (e.g., under the word node level), and the vertex and neighbor vertices information may be stored or associated with the stroke level. Of course, any desired ways of storing the vertex and/or neighbor vertices data and information may be used without departing from this invention.

Figure 5A:
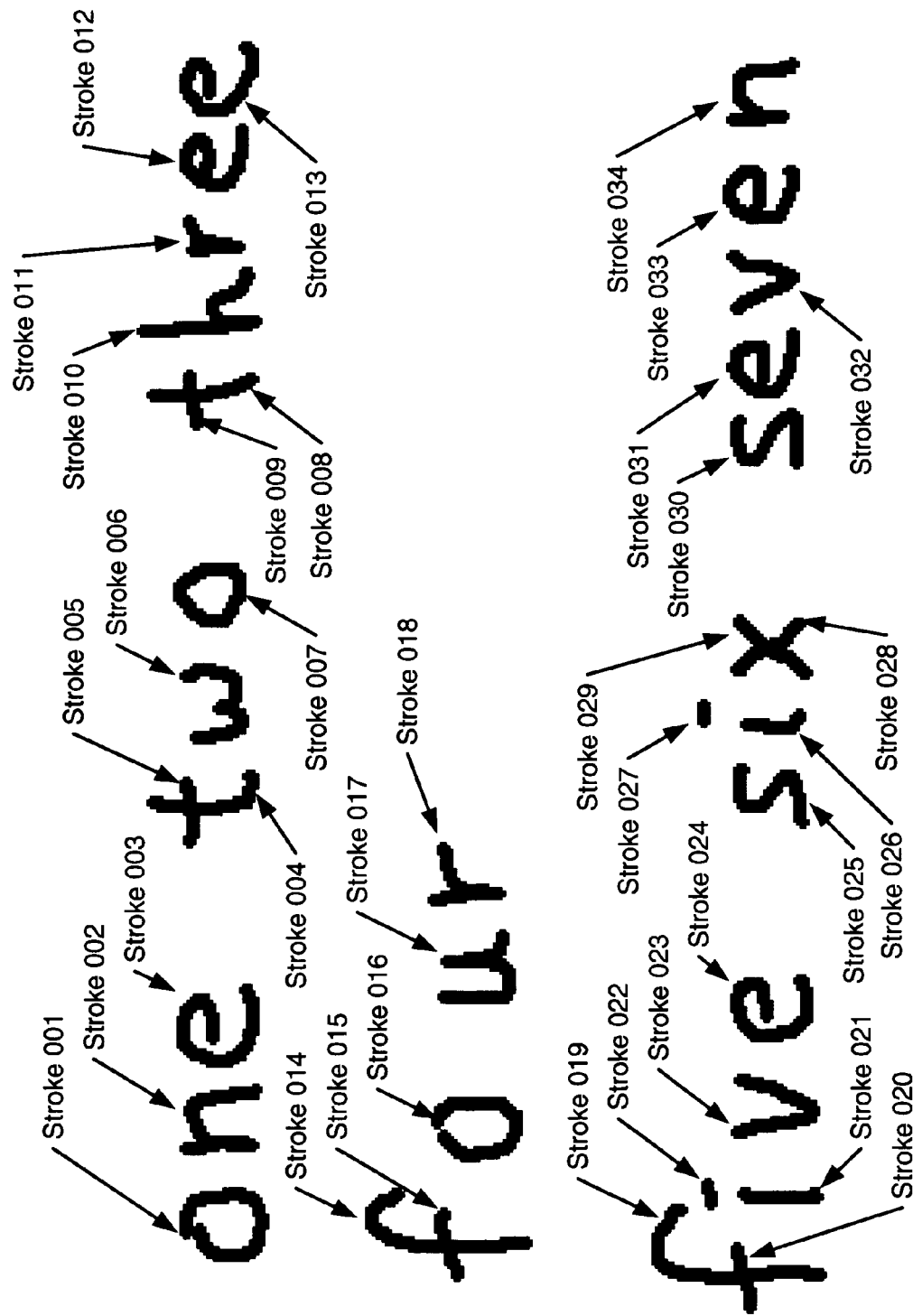
FIGS. 5A through 5E illustrate examples of electronic ink processing and data structures associated with it, e.g., in a pen-based computing environment.
Figure 5B:
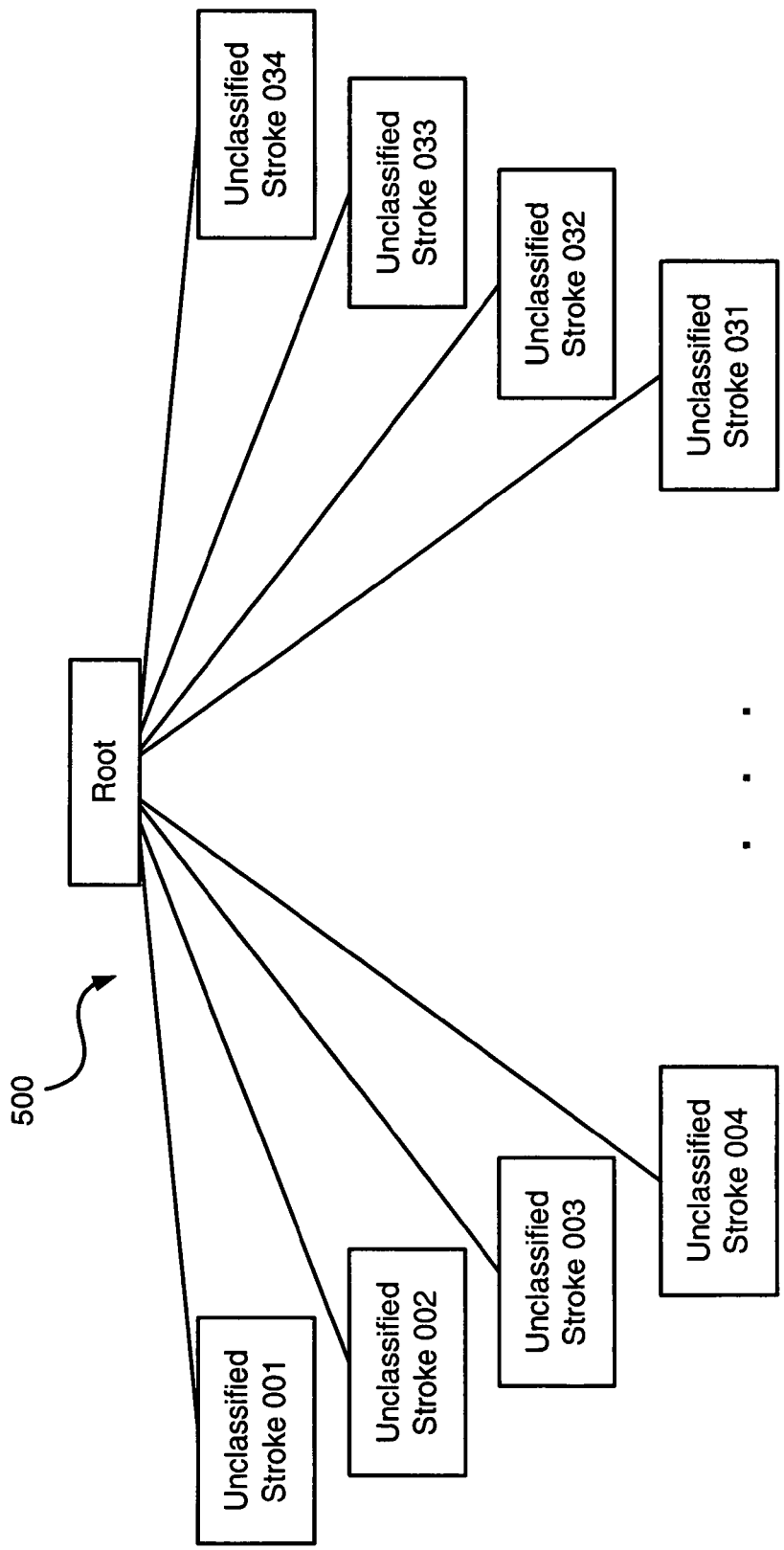

FIGS. 5A through 5E illustrate examples of how a parse tree data structure may change over time, e.g., due to addition of ink to an electronic document, due to cuts, pastes, or other changes to an electronic document, due to incremental running of a parsing engine, etc. As electronic ink is entered into an electronic document, the individual ink strokes may be unclassified and/or not arranged in a hierarchical order (e.g., the system may not yet have determined how the new information fits into a hierarchical structure). For example, as shown in FIG. 5A, the words of this example electronic document constitute 34 individual ink strokes, and when these strokes are first entered into the system and/or sent to a parsing engine, they may be placed in an initial data structure 500 as unclassified ink stroke nodes or data structures, with no discerned hierarchical structure, as shown in FIG. 5B. At this stage in the processing, if desired, a parsing engine, e.g., available as part of the electronic ink input system, an application program, an operating system, or the like and/or another processing engine, input system, application program or the like, may have determined the vertices included in and/or associated with each stroke in the electronic ink document. Also, because the neighbors are determined only at the vertex level in systems and methods according to at least some examples of this invention, at this stage of the processing, the neighboring vertices for each individual vertex may be determined (as noted above, in accordance with at least some examples of the invention, "neighboring vertices" only are located on or associated with different strokes from the stroke containing the vertices for which neighbors are being determined).

Figure 5C:
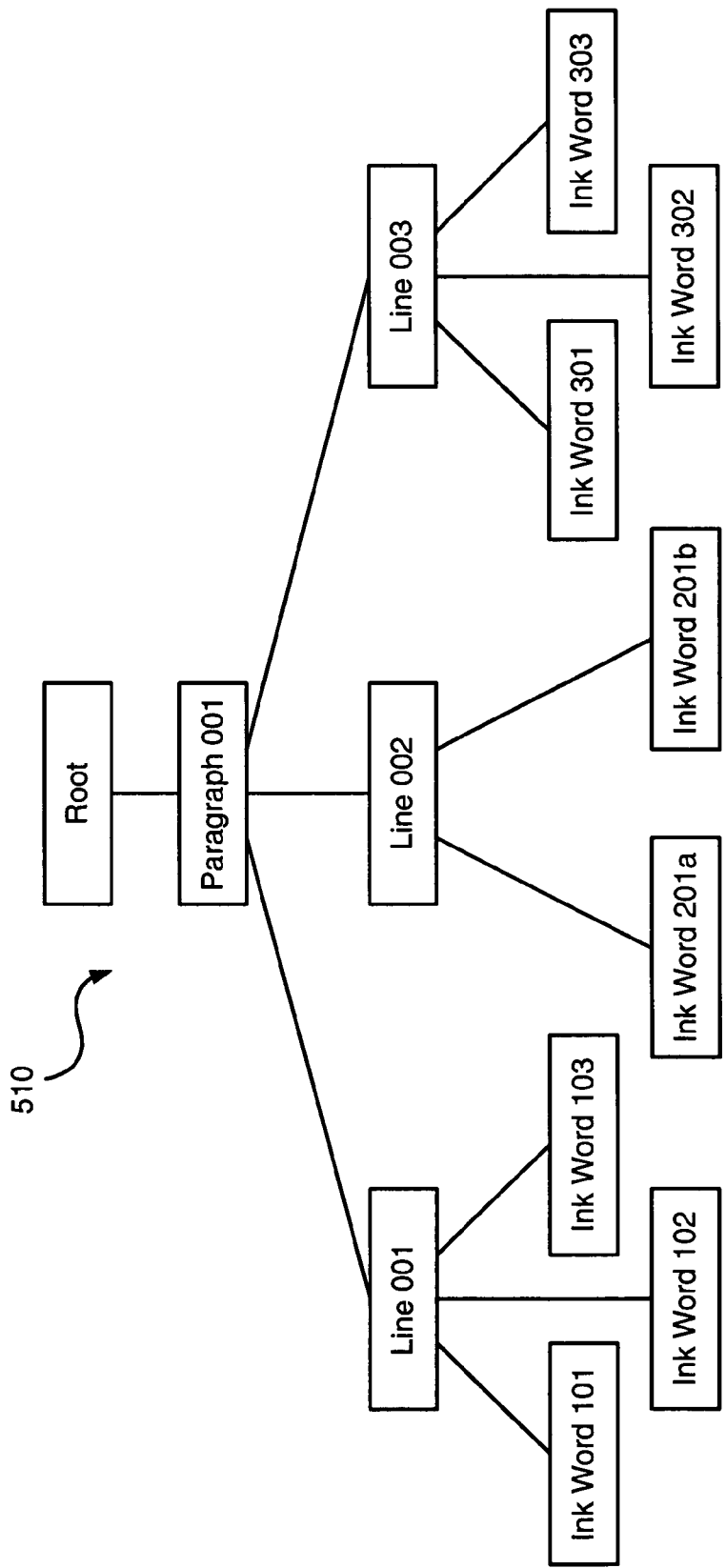

Based on various features of the input data, such as one or more of the spatial relationship between and among strokes and/or groupings of strokes, the temporal order of stroke entry, the linear relationship between and among strokes and/or groupings of strokes, the relative length of a stroke compared to other strokes, and the like, a parsing engine may operate to group or associate the individual strokes into components of a data structure 510 having a hierarchical order, e.g., like that shown in FIG. 5C. For example, as shown in FIG. 5C, a parsing engine may determine, at least initially, that the electronic document (or "root") shown in FIG. 5A constitutes a single paragraph (Paragraph 001) composed of three individual lines (Lines 001, 002, and 003). At this time, in this example, the parsing engine has determined that Line 001 is composed of three words (Ink Words 101 ("one"), 102 ("two"), and 103 ("three")), Line 002 is composed of two words (Ink Words 201a ("fo") and 201b ("ur"), and Line 003 is composed of three words (Ink Words 301 ("five"), 302 ("six"), and 303 ("seven")). Additionally, in its initial pass or passes through the ink data, the parsing engine may determine that the various ink words are comprised of the various ink strokes shown in FIGS. 5A and 5B as follows:

| Ink Word ID | Strokes |
|---|---|
| 101 | 001, 002, 003 |
| 102 | 004, 005, 006, 007 |
| 103 | 008, 009, 010, 011, 012, 013 |
| 201a | 014, 015, 016 |
| 201b | 017, 018 |
| 301 | 019, 020, 021, 022, 023, 024 |
| 302 | 025, 026, 027, 028, 029 |
| 303 | 030, 031, 032, 033, 034 |

A parsing engine, such as a classification engine, also may determine the "type" of stroke for each individual stroke, such as: text stroke, drawing stroke, music symbol stroke, mathematical symbol stroke, shape stroke, flowchart stroke, list stroke, table stroke, etc., e.g., based on relative information relating to the individual stroke, the spatially and/or temporally surrounding strokes, user input, etc.

Notably, at this stage in the processing of this example, the parsing engine has incorrectly grouped the strokes for the word "four" in Line 002 as two separate words, potentially because the letters "o" and "u" are spaced apart from one another more than a predetermined or preset maximum intra-word letter spacing parameter or threshold (if desired, as an option or alternative, this parameter may be set or determined based on statistical analysis of the ink provided in the electronic document, e.g., based on an individual user's typical writing size, intra-word spacing, inter-word spacing, and/or the like, within the electronic document). The individual stroke data (e.g., from the unclassified nodes shown in FIG. 5B) may be included as part of and/or associated with an appropriate ink word node structure (e.g., as a property or in any other desired form or format) within the initial parse tree data structure 510 shown in FIG. 5C. Parsing engines or systems of this type for electronic ink data are generally known and used in the art. Also, if not already done, the parsing engine, the ink input system or application program, the computer operating system, and/or another processing engine or application program now may determine the vertices included in and/or associated with each ink stroke in the electronic ink document and/or the neighboring vertices associated with each vertex.

Rather than waiting for all of the ink to be entered into an electronic document (e.g., all 34 strokes in this example) and processing all the strokes from their unclassified state to a hierarchical data structure using the parsing engine, in at least some examples of the invention, the parsing engine will operate incrementally and periodically as the ink data is being entered, to build up the hierarchical data structure and add in new information and nodes (and/or adding, deleting, and/or regrouping existing nodes), as appropriate and necessary while new, previously unclassified ink strokes are being entered. Incrementally operated parsing engines of this type for electronic ink data are known and used in the art.

Figure 5D:
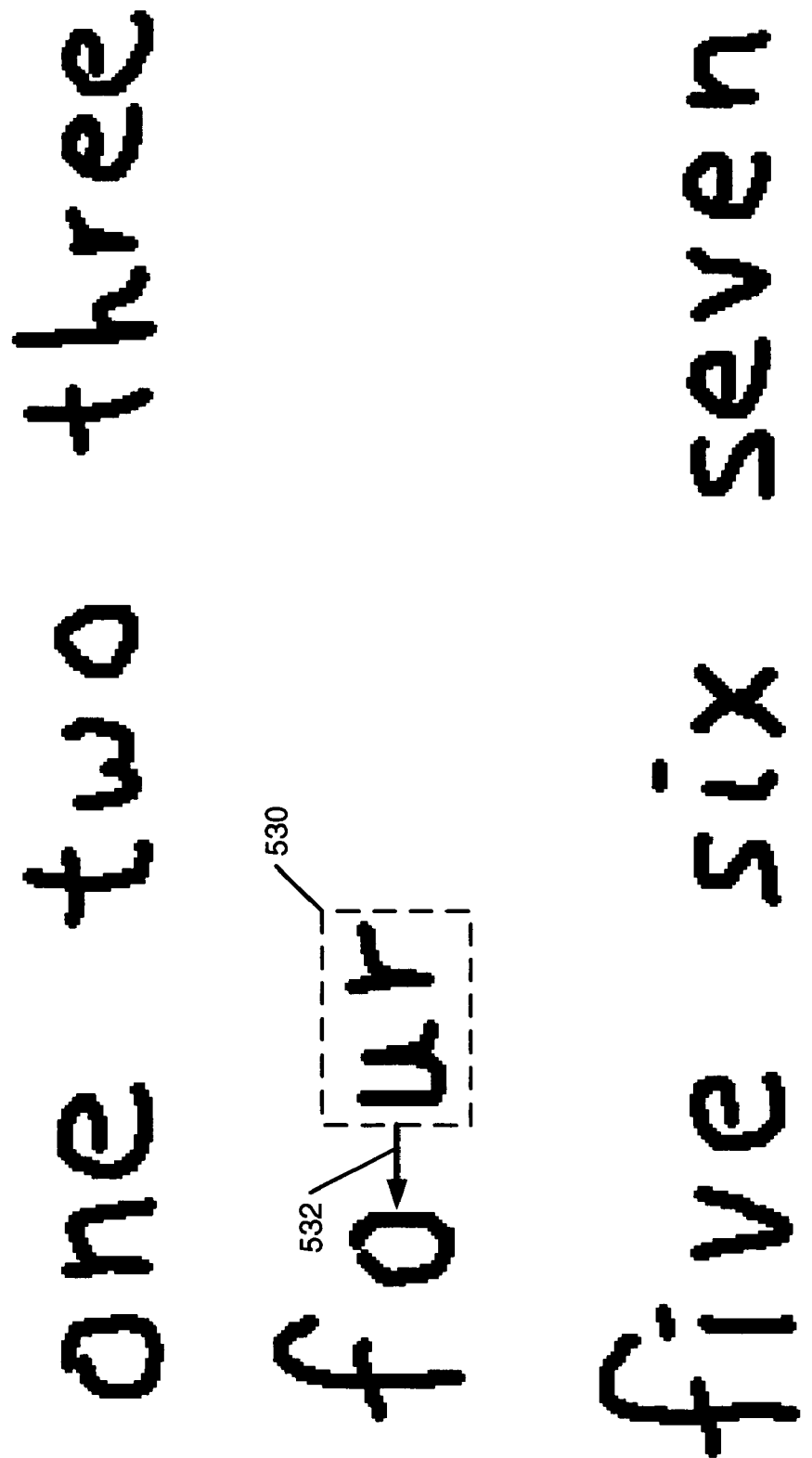
Figure 5E:
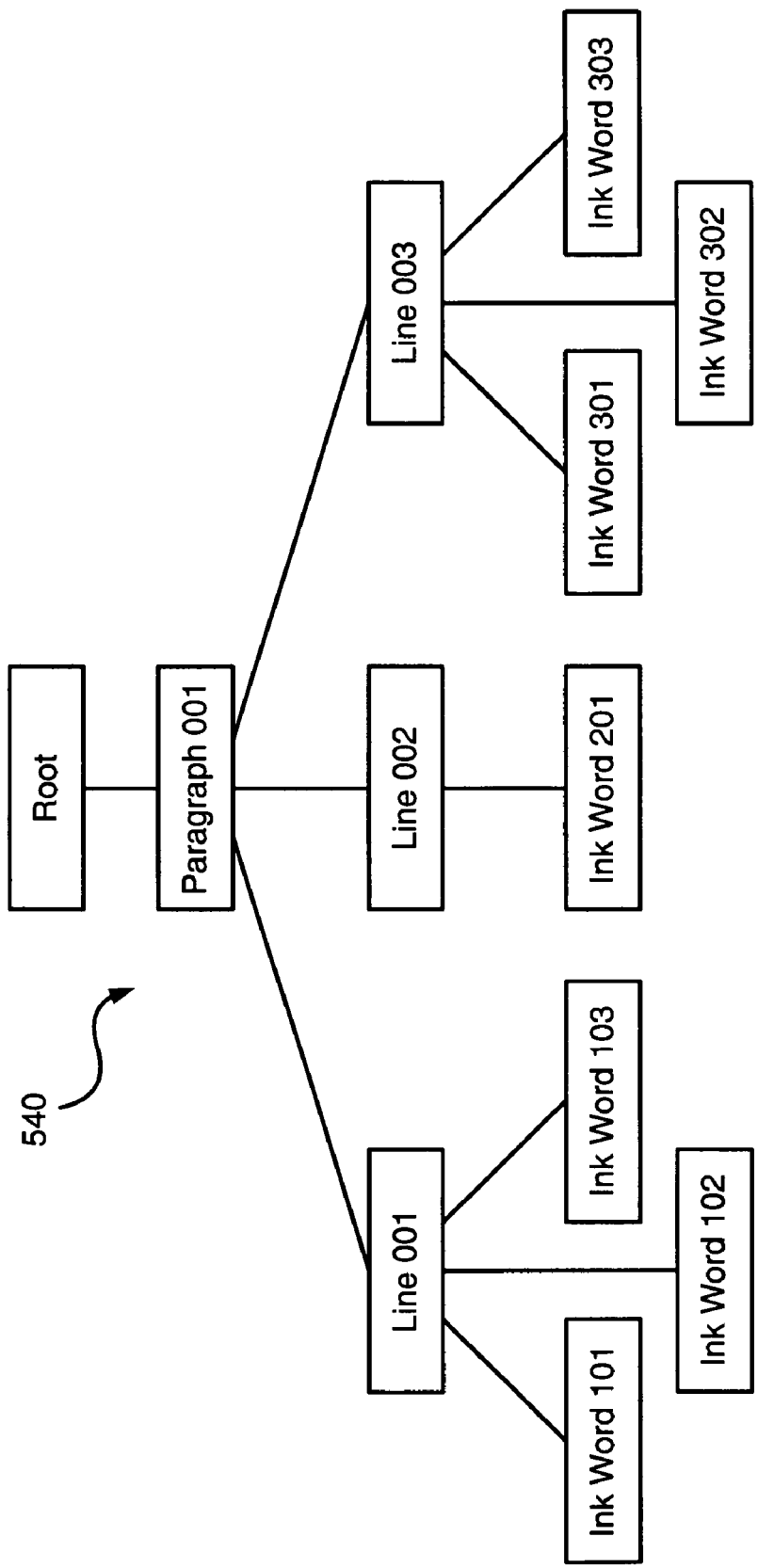

At some stage in the ink processing and/or after entry of additional electronic ink or other data, the parsing engine of this example may recognize its previous error in splitting the word "four" into two separate ink words. Recognition of this error may occur in various ways without departing from the invention, for example, during another iteration or incremental use of the parsing engine, as a result of a selection and movement operation as shown in FIG. 5D (e.g., a user selected the "ur" (as shown by lasso selection 530) and moved these letters closer to the letters "fo" (as shown by arrow 532), through use of a handwriting recognition engine (which did not recognize the character strings "fo" or "ur," but recognized the character string "four"), etc. Recognition of the error in this example will induce the parsing engine to change the electronic document data structure 510 (FIG. 5C) to the changed hierarchical structure 540 shown in FIG. 5E. Specifically, in the changed data structure 540 of FIG. 5E, Line 002 is correctly shown as containing a single word, namely Ink Word 201, corresponding to the word "four" in FIG. 5D. Of course, many different changes to the data structures and reasons for inducing data structure changes are possible without departing from this invention.

Figure 6A:
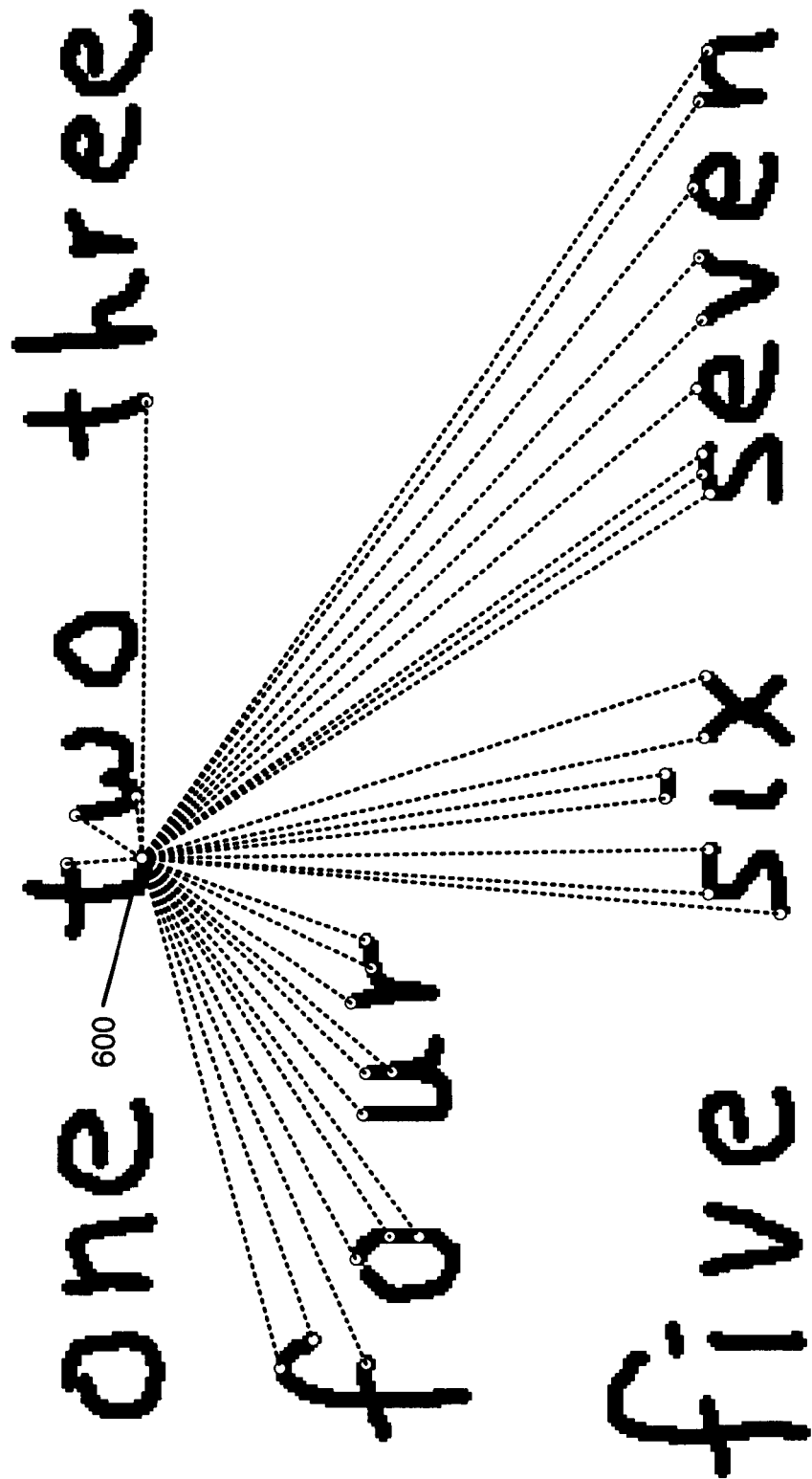
FIGS. 6A and 6B illustrate examples of neighbor determination using vertices of electronic ink input, e.g., in a pen-based computing environment.
Figure 6B:
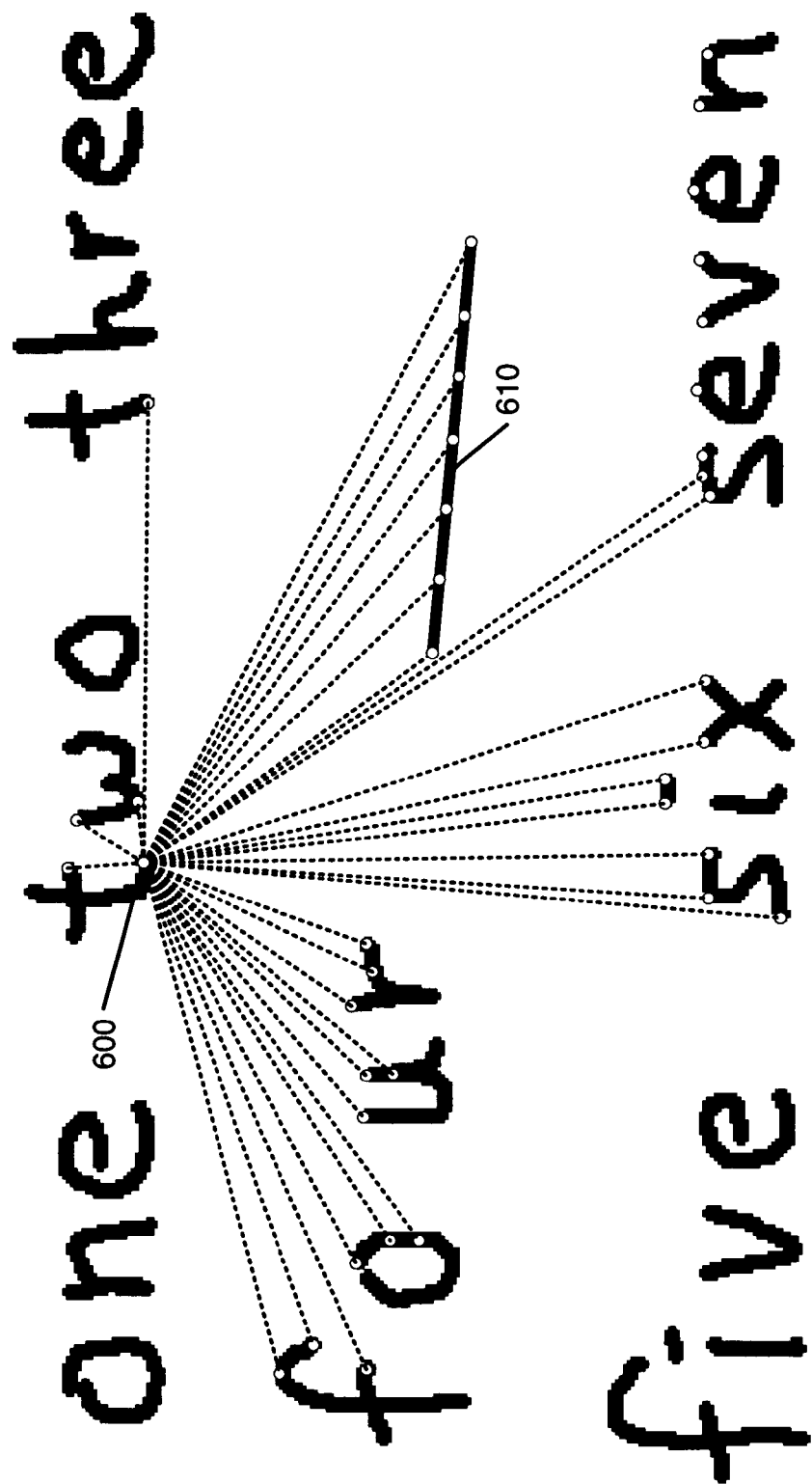

FIGS. 6A and 6B help illustrate the manner in which the "neighborhood" information remains relatively static at the vertex level despite the possibility for overall dynamic changes to the overall electronic document's data structure (and/or the ink content of the underlying electronic document). FIG. 6A illustrates the neighboring vertices identified (e.g., by Delaunay triangulation or other desired method) for an example vertex 600 at the bottom of the generally vertical stroke of the letter "t" in "two." Any stroke in this example electronic document is a "neighbor" of vertex 600 if that stroke has at least one vertex that is identified as a neighbor of vertex 600 (vertices contained on the same stroke as vertex 600 are not included as "neighbors" of vertex 600, in at least some examples of this invention). Therefore, in the illustrated example, referring again to FIG. 5A, Strokes 005, 006, 008, 014, 015, 016, 017, 018, 025, 027, 028, 029, 030, 031, 032, 033, and 034 are considered "neighbors" of vertex 600, because each of these strokes includes at least one vertex that is shown as a "neighbor" of vertex 600. Any word in this electronic document is considered a "neighbor" of vertex 600 if that word has at least one vertex that is identified as a neighbor of vertex 600 (therefore, in the illustrated example, the words "three," "four" (or both "fo" and "ur" if considered separate words by the parsing engine), "six," and "seven" are considered "neighbor" words of vertex 600). Any line in this electronic document is considered "neighbor" of vertex 600 if that line has at least one vertex that is identified as a neighbor of vertex 600 (therefore, in the illustrated example, both Lines 002 and 003 are considered "neighboring" lines of vertex 600).

Even if the parsing engine in this example originally considered the word "four" to constitute two separate words ("fo" and "ur"), correcting the parser document tree data structure to correctly identify "four" as one word would not, in any way, change the identification of the various vertices on individual strokes in the electronic document (e.g., Stroke 004

(the generally vertical stroke of the letter "t" in the word "two") still would contain the same vertices, and even the individual strokes of the word "four" (Strokes 014 through 018) would contain the same vertices). Notably, changing the parse tree data structure to change the two words "fo" and "ur" to a single word "four" also would not, in any way, change the vertices on the various strokes of the word and/or the neighboring vertices for the various vertices on individual strokes in the electronic document (e.g., Stroke 004 would maintain the same neighbors as shown in FIG. 6A, and even the individual vertices and strokes in the word "four" would continue to maintain the same neighbors—notably, as described above, to be considered a "neighbor" the potentially neighboring vertex must lie on or be associated with a different stroke from that for which the neighborhood is being determined). Therefore, changes in the hierarchical data structure above the stroke level in this example will not affect the vertices identified and/or associated with a stroke, nor will they affect the vertices identified as neighbors to the vertices in the stroke.

Changes in the neighborhood data may occur in some instances. For example, if an additional ink stroke were added to the electronic document and/or if a different ink changing event occurs, then it may be necessary to change and/or update the "neighboring vertices" data. As a more specific example, as shown in FIG. 6B, a user might enter a new ink stroke 610 to the electronic document shown in FIG. 6A. As this new ink stroke is being entered, vertices on this new stroke 610 may be determined, and neighboring vertices for the vertices of this new stroke 610 also may be determined, e.g., using Delaunay triangulation or other methods. Any previously existing vertex determined to be a "neighbor" to a new vertex on the new stroke 610 also has this vertex of new stroke 610 as its neighbor. Therefore, based on the newly determined neighbors for new stroke 610, the system will know the specific previously existing strokes or vertices for which the overall potential "neighborhood" relationship changed due to the new stroke 610 (i.e., the previously existing vertices determined as neighbors of new stroke 610), and all of the "neighboring vertices" of these identified previously existing vertices then can be redetermined (e.g., using Delaunay triangulation or another method). This new "neighbor vertices" information then may be stored, e.g., in a data structure like that illustrated in FIG. 4B. Because the previously existing vertices with potentially changed "neighbor" information are readily determined from the "neighbor vertices" determined for the newly added stroke 610, and because the new "neighbor vertices" information for the previously existing vertices can be readily determined and stored (e.g., using triangulation or another method) users will not experience significant processing delays by updating the "neighbor vertices" information and data. Moreover, these determinations and processes advantageously may be carried out in a background thread so that the user does not or barely notices any processing delays.

Figure 7:
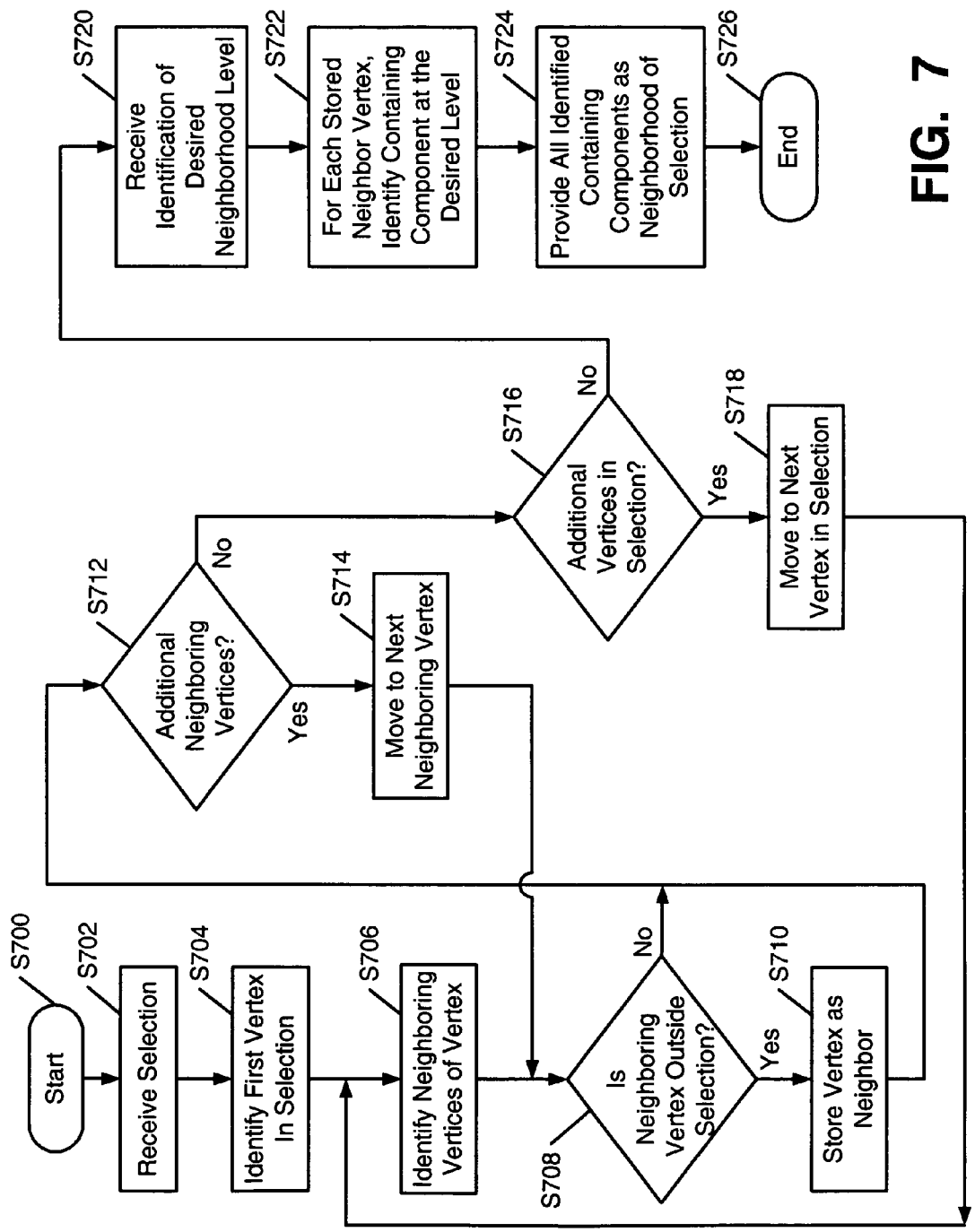
FIG. 7 illustrates an example method for determining neighbors of a selection in accordance with various examples of this invention.

FIG. 7 illustrates an example procedure in which the "neighbors" of vertices, strokes, or larger groupings of strokes (e.g., in selections containing one or more strokes, words, lines, paragraphs, blocks, or the like) may be determined at various different hierarchical levels. As this example procedure starts (S700), a selection or other identification of electronic ink data (or other data) is received (S702) identifying one or more ink strokes for which neighborhood information is desired. This selection or identification may constitute a single vertex, multiple vertices, a single stroke, multiple strokes, a single character, multiple characters, one or more words (optionally contained in one or more lines or larger hierarchical groupings), one or more lines (optionally contained in one or more paragraphs, blocks, pages, or other groupings), one or more blocks, etc. Once the selection or identification is made, a first vertex included in the selection (or optionally all of the vertices in the selection) is identified (S704). As described above in conjunction with FIG. 4A, the vertices may be defined and/or identified as the electronic ink is being entered and/or initially parsed, and the vertex information may be stored as a property (or in another manner) in the hierarchical data structure, e.g., as part of an ink word or stroke.

Looking at the first identified vertex (also called the "test vertex" in the description below), all of its neighboring vertices are identified (S706). As described above, the neighboring vertex information may be determined at any appropriate time during the ink input and/or processing, using triangulation or other techniques (e.g., Delaunay triangulation), and the neighboring vertex information may be maintained up to date, e.g., as additional ink is entered, as ink is deleted, moved, changed in size, or the like.

Any vertex determined to be a neighbor of a vertex within the selection may potentially constitute a neighboring vertex to the selection (also called a "potentially neighboring vertex" in this description). Accordingly, in the next step of this example process, a determination is made as to whether the potentially neighboring vertex is located inside or outside of the selection (S708). If the potentially neighboring vertex is not outside of the selection (answer "No" at S708), this potentially neighboring vertex is not considered a neighbor to the selection (i.e., a potentially neighboring vertex also contained within the selection will not be considered to be a neighbor to the selection), and the process moves to the next step (S712). As one more specific example, if the selection constituted an ink word (such as the word "two" from FIG. 6A above), any potentially neighboring vertices located on Strokes 004, 005, 006, or 007 are not considered to be "neighbors of the selection, even if they are neighbors of vertices within the selection, because they also are included as part of the selection. Likewise, if the selection constituted Line 001 (the combined words "one," "two," and "three" in FIG. 6A), any of the potentially neighboring vertices on Strokes 001 through 013 are not considered neighbors to the selection because they are included within the selection. If the potentially neighboring vertex identified at S706 is not included as part of the selection (Answer "Yes" at S708), information regarding this vertex (e.g., its vertex ID, a GUID identifying the vertex, or the like) is stored, and the vertex is identified as a neighbor of the selection.

As the next step in this example process (S712), a determination is made whether the first test vertex includes any additional neighboring vertices (as noted above, an individual vertex may have any number of neighboring vertices). If Yes, the process moves to the next identified neighboring vertex for the first vertex (S714) (now a potentially neighboring vertex to the selection), the procedure returns to S708, and a determination is made whether this new potentially neighboring vertex is located inside or outside of the selection (i.e., steps S708, S710, and/or S712 repeat for this next potentially neighboring vertex for the first test vertex). If and when no additional neighboring vertices remain to be tested for a given vertex (answer "No" at S712), the procedure next determines whether all of the vertices associated with or included in the selection have been tested (S716) (i.e., do any new "test vertices" remain to be tested). If additional test vertices remain to be tested (answer "Yes" at S716), the process moves to the next vertex included as part of the selection (S718) (now the new "test vertex"), and the procedure returns to S706, where the neighboring vertices are identified for this new test vertex and determinations are made whether these potential neighboring vertices are located within the original selection (i.e., steps S706 through S718 are repeated for each test vertex included in the selection). Optionally, if desired, the "neighbor" testing at S708 and the following steps can be eliminated if an earlier test is provided to determine whether the new potential neighboring vertex had previously been tested at S708 (e.g., in a previous iteration of the process with an earlier test vertex) and/or to determine whether the new potential neighboring vertex is already included in the listing of neighbor vertices created at S710. In any event, in this example method, these procedures (e.g., S706-S718) repeat until all of the potential neighboring vertices of all the test vertices in the selection have been tested to determine if they are neighbors of the selection (i.e., until answer "No" at S716 in this example procedure).

Once all of the potential neighboring vertices of all of the vertexes included in the selection have been tested (i.e., answer "No" at S716), the full neighboring vertices listing will have been collected (e.g., stored during S710 in this example procedure). From this determined listing of neighboring vertices, the individual vertices, strokes, words, lines, blocks, listings, paragraphs, drawing strokes, and the like that "neighbor" the selection may be determined. A vertex "neighbors" a selection if that vertex is located outside the selection and it is a neighbor with any vertex included in the selection. Likewise, a stroke "neighbors" a selection if any vertex within the stroke is a neighbor with any vertex included in the selection. Similarly, a word "neighbors" a selection if any vertex within the word is a neighbor with any vertex included in the selection. Also, a line "neighbors" a selection if any vertex within the line is a neighbor with any vertex included in the selection. Finally, a block, paragraph, listing, or other collection of ink strokes or other data "neighbors" a selection if any vertex included in the block, paragraph, listing, or other collection of ink strokes or other data is a neighbor with any vertex included in the selection.

Returning to the example method described in connection with FIG. 7, as a next step in the process, systems or methods receive an identification of the hierarchical level of the neighborhood that is desired to be determined (S720). For example, a user or application program may designate that it would like to locate all vertices, strokes, words, lines, paragraphs, blocks, lists, etc., that neighbor the initial selection (received at S702). Of course, this identification step S720 may occur anywhere in the process, including before, during, and/or after the time that the data indicating the selection is received at S702. Then, at S722, for any neighbor vertex determined at S710, systems and methods according to this example of the invention (e.g., using a hierarchical data structure represented in FIG. 5E) will determine the electronic ink component in the data structure, at the desired hierarchical level, that contains the determined neighbor vertex. For example, returning to the example shown in FIG. 6A, various neighboring vertices to vertex 600 were determined. By using the hierarchical structure of the ink data and knowing the identities of all the neighboring vertices of vertex 600, the system and method according to this example of the invention can easily determine hierarchical components containing the neighbors (e.g., strokes, words, lines, paragraphs, etc.) by simply locating the neighboring vertices in the data structure and moving upward in the data structure to the desired component level (e.g., to locate the identities of the neighboring strokes, words, lines, paragraphs, etc.). If desired, in at least some examples of the invention, hierarchical components will not be identified as "neighbors" if that same hierarchical component also contains any portion of the selection (e.g., Line 001 will not be identified as a "neighbor" of the word "two" in FIG. 6A because the word "two" also is included in Line 001). The identified components including the neighboring vertices (and optionally only those components that also do not include any portion of the original selection) then may be provided to the user, returned to the application program, or the like as the neighborhood information for the original selection (S724). The procedure then may end (S726) (e.g., move on to other processing, accept new or additional input, wait for other data or input, shut down, etc.).

Of course, many variations in neighborhood determination methods and systems may be made without departing from this invention. For example, the specific steps described in connection with FIG. 7 may be changed, changed in order, certain steps may be omitted, additional steps may be added, alternative methods may be used to provide the same end result, etc., without departing from this invention. Also, if desired, various limitations may be made to the type or amount of data available to an end user, the manner in which it is stored or accessed, and the like, if desired, without departing from the invention.

The following APIs may be used in obtaining and making neighborhood information available to other users, application programs, or the like.

```
public class Delaunay
{
    public void InsertVertex(PointF location,
VertexId id)
    {
    }
}
public interface ComponentMapping
{
    ComponentId GetComponentId(VertexId vertexId);
    bool IsMemberOf(VertexId vertexId, ComponentId
compId);
    VertexId[ ] GetVertices (ComponentId compId);
}
public class NeighborhoodGraph
{
    public struct NeighborInfo
    {
        public ComponentId ComponentId;
        public float Distance;
    }
    public NeighborhoodGraph (Delauney delauney,
ComponentMapping compMapping);
    public ComponentId[ ]
GetOutsideNeighbors (ComponentId compId)
    public ComponentId[ ] GetNeighbors (ComponentId
compId)
    {
    }
    public NeighborInfo[ ]
GetNeighborInfos (ComponentId compId)
    {
    }
    public float
CalculateShortestDistance (ComponentId fromCompId,
ComponentId toComponentId)
    {
    }
}
```

Of course, many variations in the manner in which various aspects of this invention operate are possible. For example, there may be many variations in the manner in which elements are stored in data structures; the manner in which vertices or located; the manner in which neighborhood relationships are determined, stored, retrieved, and presented to users or other applications; the specific APIs; and the like.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A system, comprising:
an input system for receiving input data representing plural electronic ink strokes including at least a first electronic ink stroke; and
a processing system programmed and adapted to perform operations comprising:
defining at least a first vertex in the first electronic ink stroke; and
determining, by using triangulation, at least a first neighbor vertex to the first vertex, wherein the first neighbor vertex is in an electronic ink stroke other than the first electronic ink stroke;
wherein:
the processing system groups at least some of the plural electronic ink strokes in a hierarchical manner in a data structure to form a hierarchical association of plural electronic ink components;
the hierarchical association of the plural electronic ink components has multiple hierarchical levels comprising an ink line level, an ink word level, and an ink stroke level;
at least one of ink words in the ink word level is grouped into an ink line in the ink line level, and at least one of ink strokes in the ink stroke level is grouped into an ink word in the ink word level; and
the first neighbor vertex determined is preserved when a change occurs in the data structure above the ink stroke level.

2. The system according to claim 1, further comprising:
a storage system for storing information identifying the first neighbor vertex and associating the first neighbor vertex with at least one of the first vertex or the first electronic ink stroke.

3. The system according to claim 1, wherein:
for at least some of the plural electronic ink strokes, the processing system is programmed and adapted to define plural vertices associated with the respective electronic ink strokes;
the input system is further for receiving input data indicating a selection of at least one electronic ink component; and
the processing system further is programmed and adapted to determine at least one electronic ink component that neighbors the electronic ink component or components included in the selection by determining which electronic ink component or components located outside of the selection include one or more electronic ink strokes having one or more vertices that are neighbors to one or more vertices included in the selection.

4. The system according to claim 3, wherein the processing system further is programmed and adapted to output information identifying the electronic ink component or components determined to neighbor the electronic ink component or components in the selection.

5. The system according to claim 3, wherein the selection includes at least one electronic ink word, and the processing system is programmed and adapted to determine which electronic ink word or words located outside of the selection include one or more electronic ink strokes having one or more vertices that are neighbors to one or more vertices included in the electronic ink word or words in the selection.

6. The system according to claim 1, wherein an ink sentence level is comprised of the ink line level.

7. A computer implemented method, comprising:
defining at least a first vertex in the first electronic ink stroke; and
determining, by using triangulation, at least a first neighbor vertex to the first vertex, wherein the first neighbor vertex is in an electronic ink stroke other than the first electronic ink stroke;
wherein:
a processing system groups at least some of the plural electronic ink strokes in a hierarchical manner in a data structure to form a hierarchical association of plural electronic ink components;
the hierarchical association of the plural electronic ink components has multiple hierarchical levels comprising an ink line level, an ink word level, and an ink stroke level;
at least one of ink words in the ink word level is grouped into an ink line in the ink line level, and at least one of ink strokes in the ink stroke level is grouped into an ink word in the ink word level; and
the first neighbor vertex determined is preserved when a change occurs in the data structure above the ink stroke level.

* * * * *